United States Patent
Kanda et al.

(10) Patent No.: US 11,833,793 B2
(45) Date of Patent: Dec. 5, 2023

(54) JIG PROVIDING ACCURATE POSITIONAL RELATIONSHIP BETWEEN UPPER AND LOWER LABELS FOR STICKING THE LABELS TO EACH OTHER

(71) Applicant: BROTHER KOGYO KABUSHIKI KAISHA, Nagoya (JP)

(72) Inventors: Ryuichi Kanda, Nagoya (JP); Masashi Iwamoto, Nagoya (JP); Misato Osuka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 223 days.

(21) Appl. No.: 17/153,866

(22) Filed: Jan. 20, 2021

(65) Prior Publication Data

US 2021/0237416 A1  Aug. 5, 2021

(30) Foreign Application Priority Data

Jan. 30, 2020  (JP) ................................ 2020-013727

(51) Int. Cl.
   *B32B 37/00* (2006.01)
   *B32B 38/00* (2006.01)

(52) U.S. Cl.
   CPC ...... *B32B 37/0046* (2013.01); *B32B 38/0004* (2013.01)

(58) Field of Classification Search
   CPC ............ B32B 37/0046; B32B 38/0004; B32B 2519/00; B32B 38/1841; B31D 2201/02; B31D 1/021; B31D 1/02; B31D 1/026
   See application file for complete search history.

(56) References Cited

U.S. PATENT DOCUMENTS 5,683,218 A * 11/1997 Mori ...................... B26D 7/025
                                                            412/40
2005/0238836 A1* 10/2005 Hodsdon .................... C09J 7/20
                                                            428/40.1

(Continued)

FOREIGN PATENT DOCUMENTS

CN  204195821 U  *  3/2015
JP  H06-102828 A  4/1994

(Continued)

OTHER PUBLICATIONS

JP2012115529A Machine Translation of Description (EPO/Google) (Year: 2023).*

(Continued)

*Primary Examiner* — Cynthia L Schaller
(74) *Attorney, Agent, or Firm* — KENEALY VAIDYA LLP

(57) ABSTRACT

A jig for sticking a first sheet superposed on a second sheet to the second sheet in a thickness direction of the first and second sheets includes a first regulating portion, a second regulating portion, and a nipper. The first regulating portion regulates a position of the first sheet superposed on the second sheet to be aligned with a position of the second sheet in a first direction perpendicular to the thickness direction. The second regulating portion regulates a position of the first sheet superposed on the second sheet to be aligned with a position of the second sheet in a second direction perpendicular to the thickness direction and the first direction. The nipper nips the first sheet and the second sheet superposed and aligned with each other in the thickness direction such that at least a part of a peripheral portion of the first sheet is exposed.

20 Claims, 21 Drawing Sheets

(56) References Cited

U.S. PATENT DOCUMENTS

| | | | |
|---|---|---|---|
| 2009/0104393 A1* | 4/2009 | Asano | G09F 21/04 |
| | | | 156/391 |
| 2014/0072388 A1 | 3/2014 | Hashimoto et al. | |
| 2015/0086297 A1 | 3/2015 | Kubota et al. | |

FOREIGN PATENT DOCUMENTS

| | | | | |
|---|---|---|---|---|
| JP | 2009-66835 A | | 4/2009 | |
| JP | 2009-066836 A | | 4/2009 | |
| JP | 2009-143669 A | | 7/2009 | |
| JP | 2012115529 A | * | 6/2012 | |
| JP | 2014-111501 A | | 6/2014 | |
| JP | 2017-186175 A | | 10/2017 | |
| JP | 2019-64615 A | | 4/2019 | |
| WO | WO-0044842 A1 | * | 8/2000 | C09J 7/401 |
| WO | WO-03053690 A1 | * | 7/2003 | |

OTHER PUBLICATIONS

WO-03053690-A1 Machine Translation of Description (EPO/Google) (Year: 2023).*
CN204195821U Machine Translation of Description (EPO/Google) (Year: 2023).*
Office Action issued in Japanese Patent Application No. 2020-013727 dated Aug. 22, 2023.

* cited by examiner

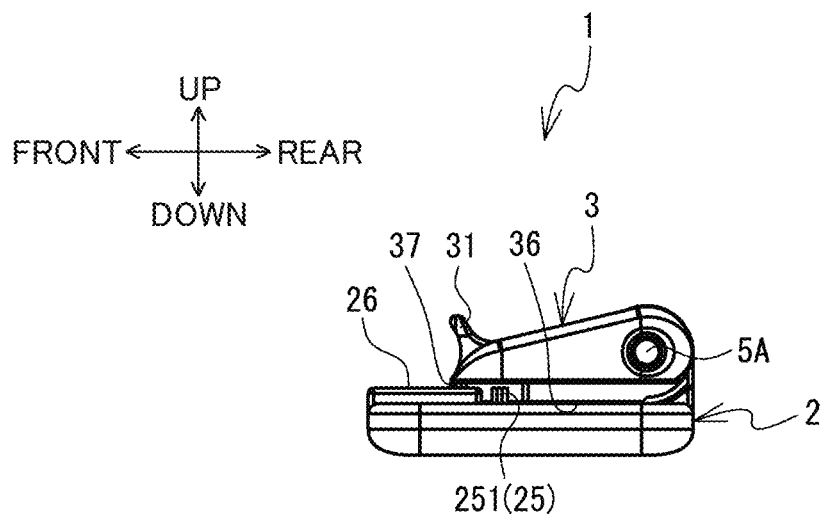
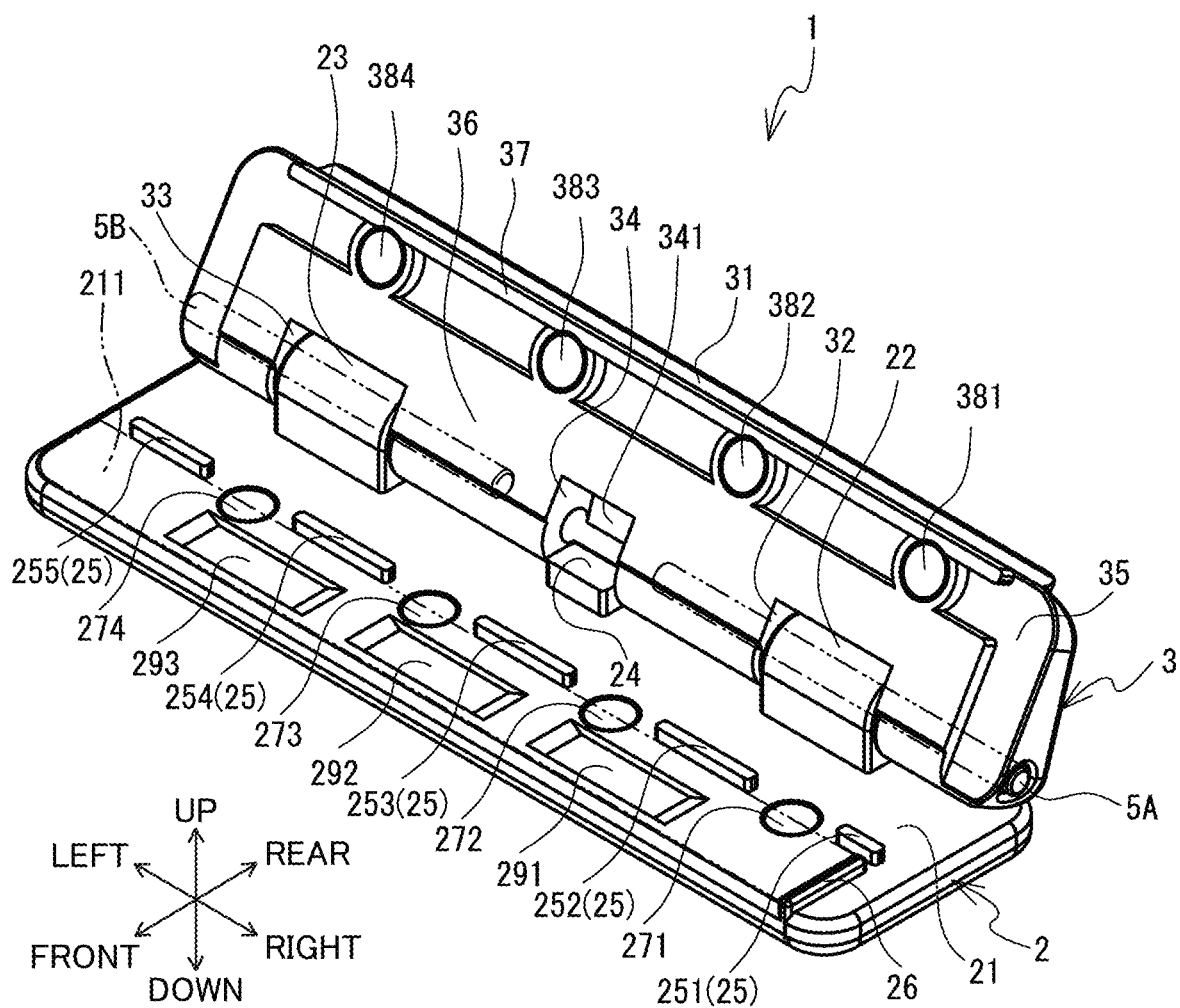

JIG PROVIDING ACCURATE POSITIONAL RELATIONSHIP BETWEEN UPPER AND LOWER LABELS FOR STICKING THE LABELS TO EACH OTHER

CROSS REFERENCE TO RELATED APPLICATION

This application claims priority from Japanese Patent Application No. 2020-013727 filed Jan. 30, 2020. The entire content of the priority application is incorporated herein by reference.

TECHNICAL FIELD

The present disclosure relates to a jig, and more particularly, to a label laminating device.

BACKGROUND

There has been known a label laminating device configured to stick a tape-like second label and a tape-like first label together in a superposed manner as described in Japanese Patent Application Publication No. 2009-066835. Each of the first label and the second label includes a base tape, an adhesive layer formed on an underside surface of the base tape, and a release tape bonded to the underside surface through the adhesive layer.

The label laminating device includes a guide portion and a fixing portion. The guide portion is configured to guide respective end surfaces of the first label and the second label along a guide surface for fixing relative position therebetween. The fixing portion is configured to fix the first label and the second label superposed over the first label against to the guide portion.

SUMMARY

In the above-described conventional label laminating device, positioning of the first label and the second label in a direction perpendicular to the guide surface can be performed. However, positioning of the first label and the second label in a direction parallel to the guide surface needs to be performed manually by a user.

Further, for sticking two labels to each other, a user partly peels the release tape off the second label and turns up the peeled part of the release tape in a state where the first label and the second label are fixed in position relative to each other with the second label superposed on the first label; and then, sticks the exposed adhesive layer of the second tape to the first tape. Here, since the size of the base tape of the second label is equal to that of the release tape of the second label, a labor for sticking the first tape and the second tape to each other requires user's skill, and thus, poor sticking is likely to occur.

In view of the foregoing, it is an object of the disclosure to provide a jig capable of accurately and easily sticking a first tape and a second tape to each other without positional displacement from each other.

In order to attain the above and other objects, according to one aspect, the disclosure provides a jig for sticking a first sheet superposed on top of a second sheet to the second sheet in a thickness direction of the first sheet and the second sheet. The first sheet includes an adhesive sheet and a release sheet releasably adhered to the adhesive sheet. The first sheet has: a first edge in a first direction perpendicular to the thickness direction; and a third edge in a second direction perpendicular to the thickness direction and the first direction. The second sheet has a second edge in the first direction and a fourth edge in the second direction. The jig includes a first regulating portion, a second regulating portion, and a nipper. The first edge and the second edge are configured to be abutted on the first regulating portion to regulate a position in the first direction of the first sheet superposed on the second sheet to be aligned with a position in the first direction of the second sheet. The third edge and the fourth edge are configured to be abutted on the second regulating portion to regulate a position in the second direction of the first sheet superposed on the second sheet to be aligned with a position in the second direction of the second sheet such that a contour of the first sheet and a contour of the second sheet are aligned with each other. The nipper is configured to nip the first sheet and the second sheet superposed and aligned with each other in the thickness direction such that a part of a peripheral portion of the first sheet is exposed to an outside of the nipper, the part of the peripheral portion of the first sheet including an edge opposite the first edge in the first direction of the first sheet.

According to another aspect, the disclosure provides a set of a jig, a first sheet and a second sheet for use with the jig. The jig is configured to stick the first sheet to an upper surface of the second sheet in a thickness direction of the first sheet and the second sheet. The first sheet includes: an adhesive sheet; and a release sheet releasably adhered to the adhesive sheet. The first sheet has a first edge in a first direction perpendicular to the thickness direction. The release sheet has a cut line which segments the release sheet into a first section including the first edge and a second section including an opposite edge opposite to the first edge in the first direction. The second sheet has a second edge in the first direction. The jig includes a nipper configured to nip a part of the first sheet and a part of the second sheet such that the first edge and the second edge are superposed with each other in the thickness direction, the part of the first sheet including the first section of the release sheet and excluding the second section of the release sheet, and the part of the second sheet including the second edge.

According to still another aspect, the disclosure provides a jig for sticking a first sheet superposed on top of a second sheet to the second sheet in a thickness direction of the first sheet and the second sheet. The first sheet includes an adhesive sheet and a release sheet releasably stuck to the adhesive sheet. The first sheet has: a first edge in a first direction perpendicular to the thickness direction; and a third edge in a second direction perpendicular to the thickness direction and the first direction. The second sheet has a second edge in the first direction and a fourth edge in the second direction. The jig includes: a base plate having a rectangular shape; a pressure plate having a rectangular shape; a hinge portion; a first regulating portion provided on the base plate; and a second regulating portion provided on the base plate. A portion of the first sheet and a portion of the second sheet superposed with each other are configured to be placed on the base plate such that the portion of the first sheet is superposed on the portion of the second sheet and the portion of the second sheet is placed on the base plate, the portion of the first sheet including the first edge and the portion of the second sheet including the second edge. The pressure plate is configured to be urged toward the base plate for nipping, in the thickness direction, the portion of the first sheet and the portion of the second sheet superposed with the first sheet in cooperation with the base plate such that the pressure plate faces the portion of the first sheet. The hinge portion pivotally movably connects together the base plate and the pressure plate at each end in the first direction of the base plate and the pressure plate to open and close the pressure plate with respect to the base plate. The first edge and the second edge are configured to be abutted on the first regulating portion to regulate a position in the first direction of the first sheet superposed on the second sheet to be aligned with a position in the first direction of the second sheet. The first regulating portion extends linearly. The third edge and the fourth edge are configured to be abutted on the second regulating portion to regulate positions in the second direction of the first sheet and the second sheet superposed with each other such that a contour of the first sheet and a contour of the second sheet are aligned with each other. The second regulating portion extends linearly.

BRIEF DESCRIPTION OF THE DRAWINGS

The particular features and advantages of the embodiment(s) as well as other objects will become apparent from the following description taken in connection with the accompanying drawings, in which:

FIG. 3. is a right side view of the jig 1 according to the first embodiment in the closed state;

FIG. 4 is a perspective view of the jig 1 according to the first embodiment, wherein the jig 1 is in an open state;

DETAILED DESCRIPTION

First Embodiment

Figure 1:
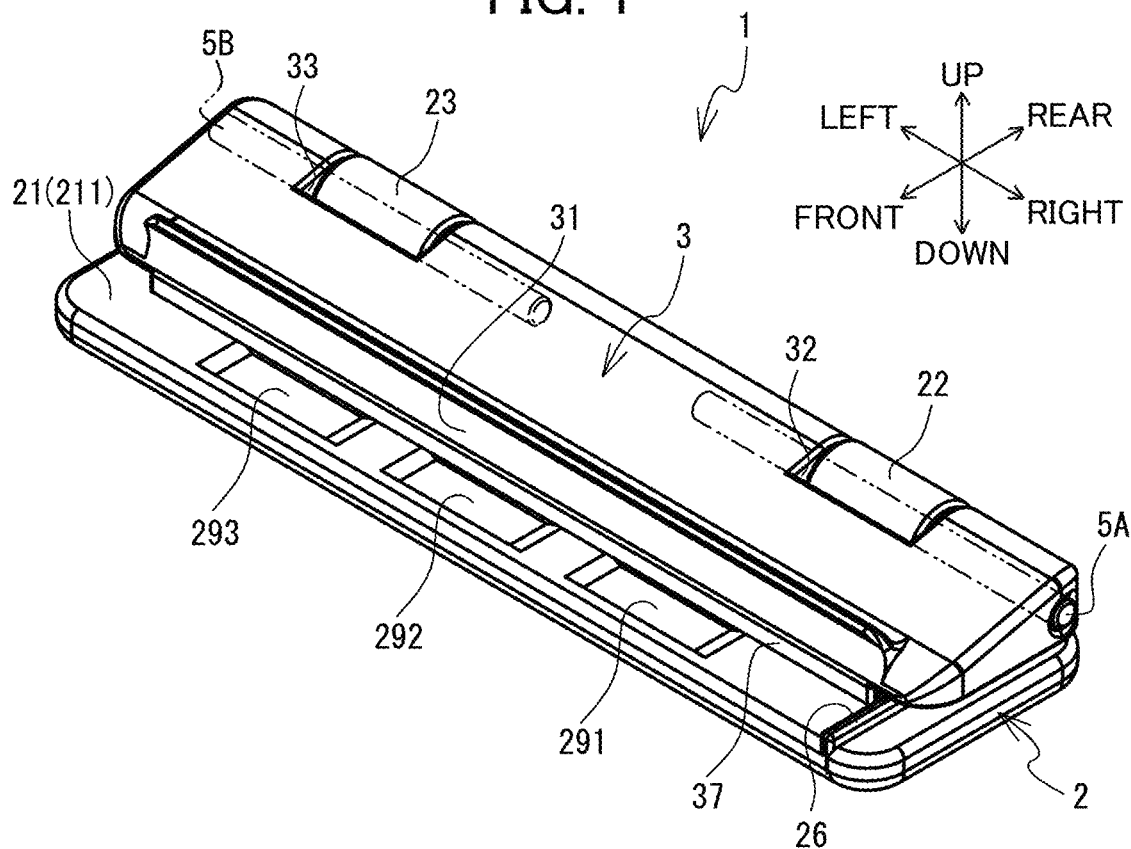
FIG. 1 is a perspective view of a jig 1 according to a first embodiment of the disclosure, wherein the jig 1 is in a closed state.

A jig 1 according to a first embodiment of the present disclosure will be described with reference to FIGS. 1 through 11B.

In the following description, directions will be referred to based on those directions indicated in the drawings, such as frontward, rearward, upward, downward, leftward, and rightward. An orientation or a posture of the jig 1 will be described on a basis of the directions indicated in the drawings. Further, orientations of a lower label 11 and an upper label 12 to be used in the jig 1 will be referred to on a basis of the directions indicated in FIGS. 8 through 11.

A structure of the jig 1 will be described with reference to FIGS. 1 through 6.

Figure 2:
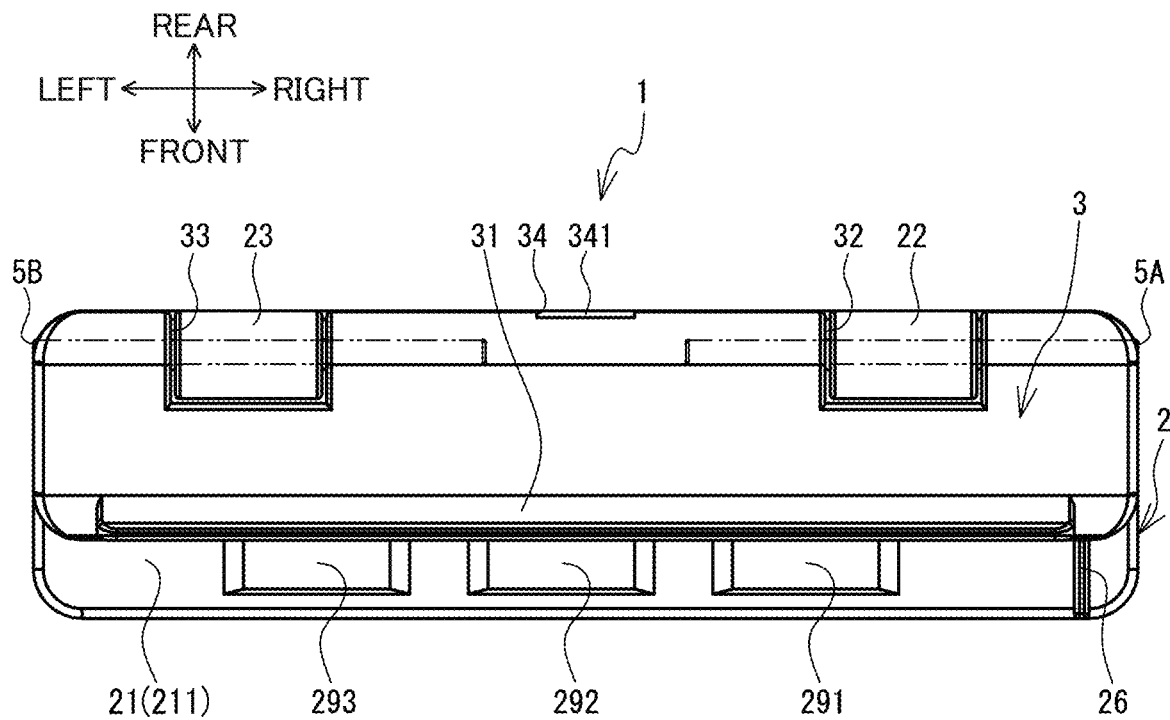
FIG. 2. is a plan view of the jig 1 according to the first embodiment in the closed state.

As illustrated in FIGS. 1 through 3, the jig 1 includes a base plate 2 and a pressure plate 3. The base plate 2 and pressure plate 3 are both made from resin. The pressure plate 3 is pivotally movably connected to the base plate 2 between a closed position (FIGS. 1-3) and an open position (FIGS. 4-6).

Figure 5:
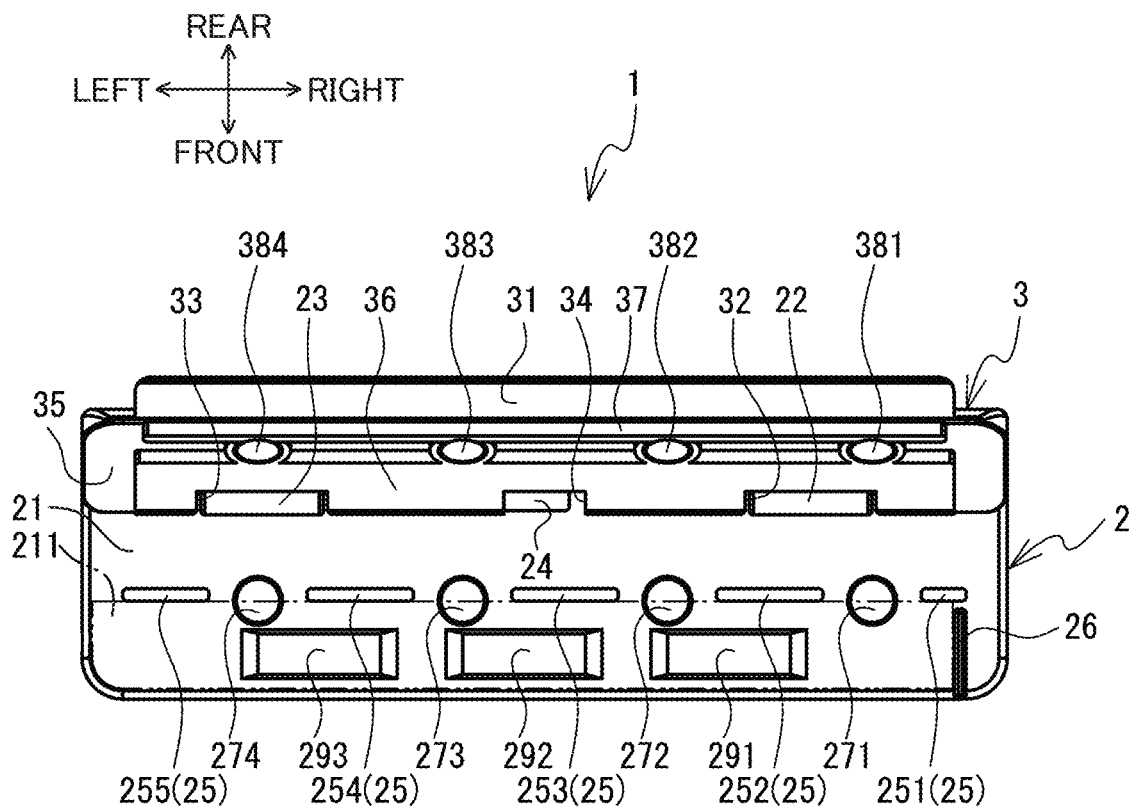
FIG. 5. is a plan view of the jig 1 according to the first embodiment in the open state.
Figure 6:
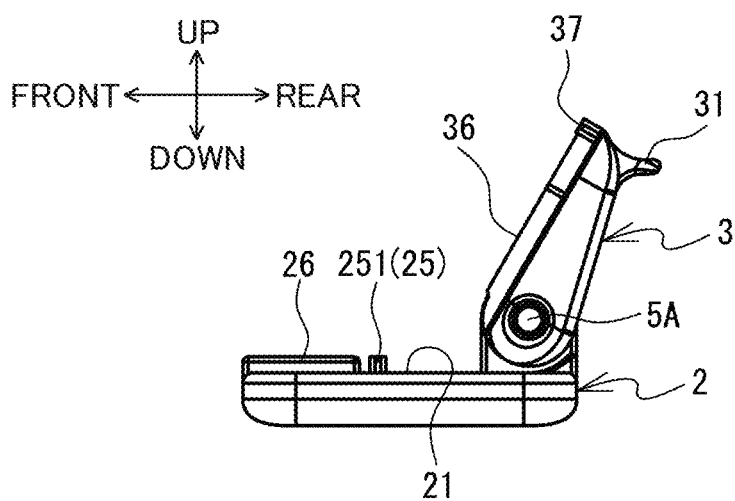
FIG. 6. is a right side view of the jig 1 according to the first embodiment in the open state.

As illustrated in FIGS. 4 and 5, the base plate 2 is a generally rectangular-shaped plate member elongated in a leftward/rightward direction in a plan view. The base plate 2 has four tapered corner portions each having a generally arcuate shape in a plan view. The base plate 2 has an upper surface 21 where hinges 22 and 23, an engagement protrusion 24, five first ribs 25 (251, 252, 253, 254, 255), a second rib 26, four magnets 271, 272, 273 and 274 are provided. Three rectangular recessed portions 291, 292 and 293 are also formed on the upper surface 21.

The hinges 22 and 23 are positioned at a rear end portion of the upper surface 21 of the base plate 2 such that the hinges 22 and 23 are spaced apart from each other in the leftward/rightward direction. Each of the hinges 22 and 23 has a shape of generally rectangular parallelepiped protruding upward from the upper surface 21 and extending in the leftward/rightward direction. Each of the hinges 22 and 23 is formed with a shaft hole (not illustrated) positioned at a center portion thereof in a side view and extending throughout a length thereof in the leftward/rightward direction.

The engagement protrusion 24 is positioned between the hinges 22 and 23 in the leftward/rightward direction. The engagement protrusion 24 has a shape of generally rectangular parallelepiped protruding upward from the upper surface 21. The five first ribs 251-255 are arranged in line at intervals in the leftward/rightward direction on the upper surface 21. Specifically, the five first ribs 251-255 are arrayed in line on an imaginary linear line extending in the leftward/rightward direction and positioned frontward of a general center in a frontward/rearward direction of the upper surface 21 in a plan view. Each first rib 25 (251-255) protrudes upward from the upper surface 21 and extends in the leftward/rightward direction. The rightmost first rib 251 has a length in the leftward/rightward direction shorter than that of each one of the remaining first ribs 252 through 255.

The second rib 26 protrudes upward from the upper surface 21. The second rib 26 extends linearly from a position adjacent to a right end portion of the rightmost first rib 251 toward a front end of the upper surface 21. That is, the second rib 26 extends in a direction perpendicular to an extending direction of each first rib 25 (251-255), i.e., in the frontward/rearward direction. The second rib 26 has a generally rectangular shape in a plan view. The second rib 26 has a height from the upper surface 21 equal to a height of each first rib 25 (251-255). Incidentally, a protruding length of the second rib 26 and protruding lengths of the first ribs 251-255 from the upper surface 21 are greater than a sum of a thickness of the lower label 11 and a thickness of the upper label 12.

Figure 8:
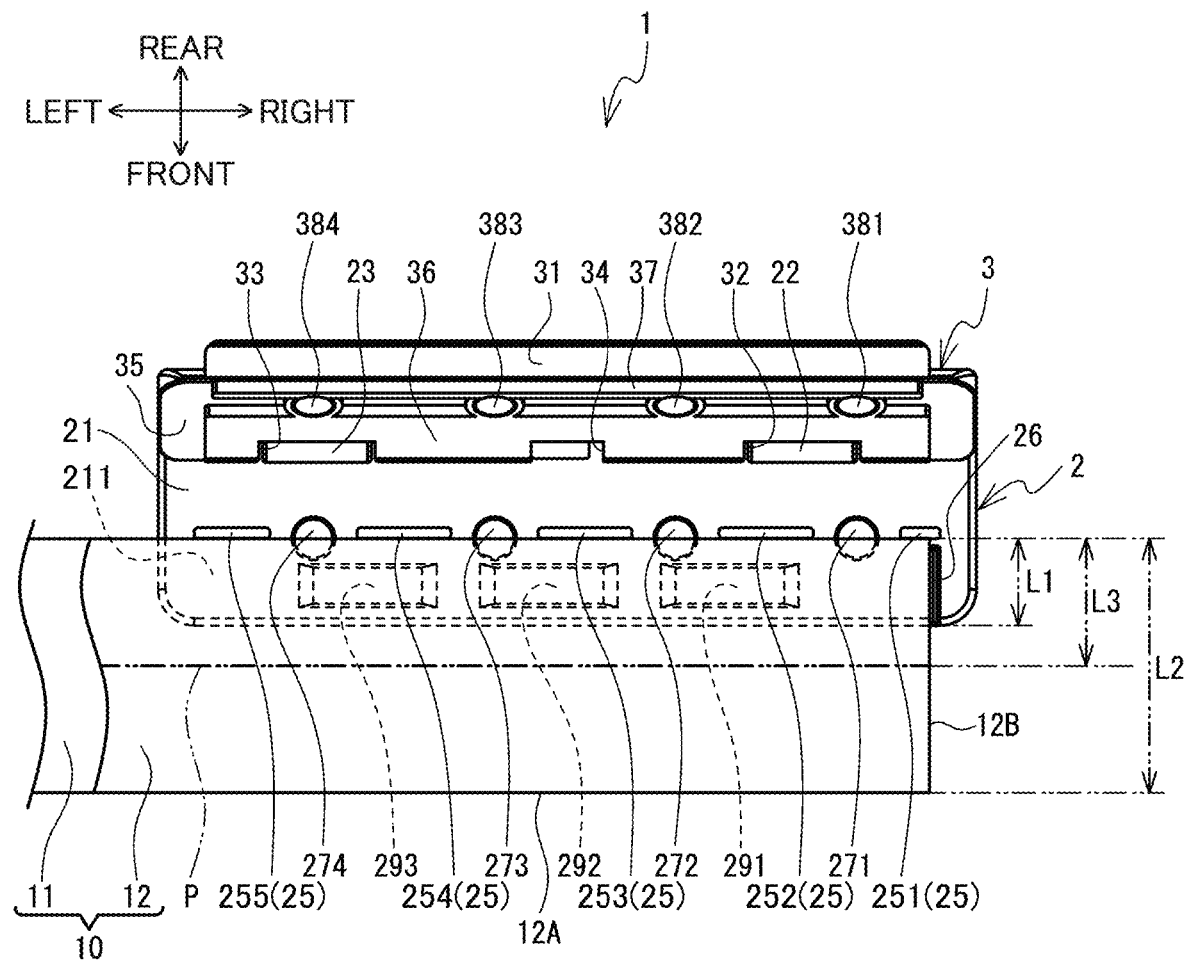
FIG. 8 is a plan view illustrating a state where the lower label 11 and the upper label 12 are placed on a label placement region 211 of a base plate 2 of the jig 1 according to the first embodiment.

The upper surface 21 has a label placement region 211 sectioned by the first ribs 251-255 and the second rib 26. Specifically, front surfaces of the first ribs 251-255 define a rear edge of the label placement region 211, and a left surface of the second rib 26 defines a right edge of the label placement region 211. As will be described later, one side portions (rear end portions) of the lower label 11 and the upper label 12 superposed therewith are placed on the label placement region 211, as illustrated in FIG. 8.

Each of the four magnets 271-274 has a disc shape, and is embedded in a circular recess (not illustrated) formed in the upper surface 21 of the base plate 2. Upper surfaces of the respective magnets 271-274 are flush with the upper surface 21.

The three rectangular recesses 291-293 are positioned within the label placement region 211. The rectangular recesses 291-293 are arrayed with one another in the leftward/rightward direction at intervals. Each of the rectangular recesses 291-293 has a rectangular shape elongated in the leftward/rightward direction in a plan view, and is recessed downward from the upper surface 21.

A structure of the pressure plate 3 will be described next.

As illustrated in FIGS. 1 through 3, the pressure plate 3 is a plate-like member having a generally rectangular shape elongated in the leftward/rightward direction in a plan view. The pressure plate 3 has a length in the leftward/rightward direction approximately equal to that of the base plate 2. The pressure plate 3 has a length in the frontward/rearward direction shorter than that of the base plate 2. For example, the front-rear length of the pressure plate 3 is about two third of the front-rear length of the base plate 2. The pressure plate 3 has a rear end portion positioned in alignment with the rear end portion of the upper surface 21 of the base plate 2. The rear end portion of the pressure plate 3 is pivotally movably connected to the base plate 2 through the hinges 22 and 23 so that the pressure plate 3 is movable between the open position (FIGS. 4-6) and the closed position (FIGS. 1-3).

The pressure plate 3 has a front end portion provided with an operating portion 31. The operating portion 31 has a rib-like shape extending along the front end portion of the pressure plate 3 and protruding upward therefrom. The rear end portion of the pressure plate 3 is formed with three rectangular grooves 32, 33 and 34. Each of the rectangular grooves 32-34 has a generally U-shape opening downward when viewed from a front side of the jig 1 with the pressure plate 3 placed at the open position (see FIGS. 4 and 5).

The rectangular groove 32 is a rightmost groove among the grooves 32-34, and is at a position corresponding to the position of the hinge 22 of the base plate 2 in the leftward/rightward direction. The rectangular groove 32 has a length in the leftward/rightward direction long enough to receive the hinge 22 therein. The rectangular groove 33 is a leftmost groove among the grooves 32-34, and is at a position corresponding to the position of the hinge 23 of the base plate 2 in the leftward/rightward direction. The rectangular groove 33 has a length in the leftward/rightward direction long enough to receive the hinge 23 therein.

The rectangular groove 34 is positioned at an intermediate position between the rectangular groove 32 and the rectangular groove 33 in the leftward/rightward direction. A counterpart engagement plate 341 is provided at the rectangular groove 34. The counterpart engagement plate 341 is positioned at an upper inside portion of the rectangular groove 34 for closing the rectangular groove 34 when the pressure plate 3 is at the closed position. The counterpart engagement plate 341 is configured to be engaged with the engagement protrusion 24 when the pressure plate 3 is at the open position. The rectangular groove 34 has a length in the leftward/rightward direction long enough to receive the engagement protrusion 24 therein.

A shaft hole (not illustrated) is formed in the rear end portion of the pressure plate 3. The shaft hole extends in the leftward/rightward direction to penetrate the rear end portion of the pressure plate 3 in the leftward/rightward direction. The shaft hole is in communication with the rectangular grooves 32-34.

The pressure plate 3 has a lower surface 35 configured to face the upper surface 21 of the base plate 2 when the pressure plate 3 is at the closed position. On the lower surface 35, a raised portion 36, a pressure rib 37, and four magnetic bodies 381, 382, 383 and 384 are provided. The raised portion 36 has a generally rectangular shape elongated in the leftward/rightward direction in a bottom view of the pressure plate 3. The raised portion 36 is positioned closer to a rear end portion of the lower surface 35 rather than to a front end portion of the lower surface 35. The raised portion 36 protrudes downward from the lower surface 35 when the pressure plate 3 is at the closed position.

The pressure rib 37 extends along the front end portion of the lower surface 35. The pressure rib 37 protrudes downward when the pressure plate 3 is at the closed position. The pressure rib 37 protrudes from the lower surface 35 by a protruding amount that is slightly greater than a protruding amount of the raised portion 36 from the lower surface 35.

The four magnetic bodies 381-384 are positioned between the raised portion 36 and the pressure rib 37 in the frontward/rearward direction. Each of the magnetic bodies 381-384 has a disc shape, and is arranged at a position corresponding to the position of each of the magnets 271-274 provided on the upper surface 21 of the base plate 2.

For assembling the pressure plate 3 to the base plate 2, the hinges 22 and 23 of the base plate 2 are inserted into the rectangular grooves 32 and 33, respectively, such that the shaft hole of the pressure plate 3 is aligned with the shaft holes of the hinges 22 and 23. A pivot shaft 5A is inserted in the shaft hole of the pressure plate 3 from a right end thereof to extend into the shaft hole of the hinge 22. Another pivot shaft 5B is inserted in the shaft hole of the pressure plate 3 from a left end thereof to extend into the shaft hole of the hinge 23. In this way, the rear end portion of the pressure plate 3 is connected to the rear end portion of the base plate 2 through the pivot shafts 5A and 5B such that the pressure plate 3 is pivotally movable relative to the base plate 2 about axes of the pivot shafts 5A and 5B.

Next, opening and closing operations performed in the jig 1 will be described.

Figure 9:
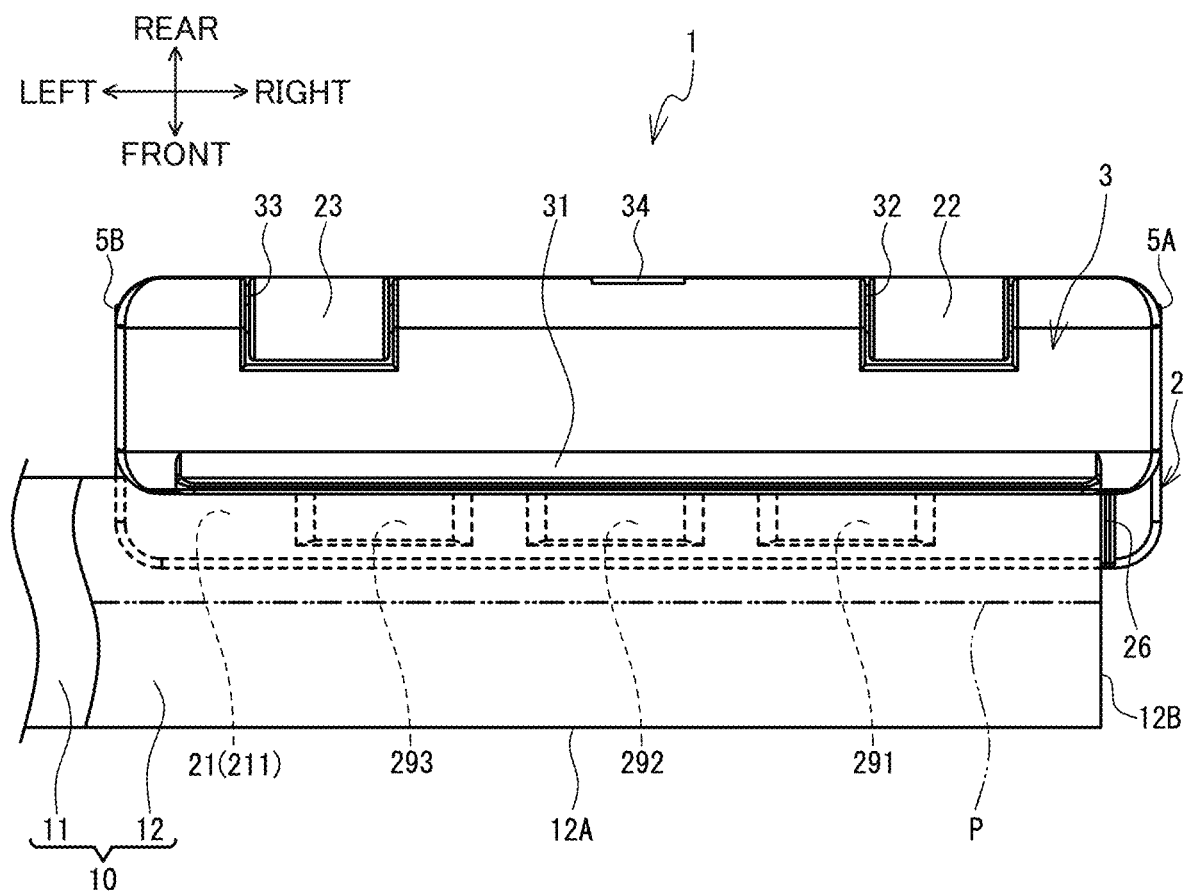
FIG. 9 is a plan view illustrating a state where the lower label 11 and the upper label 12 are nipped by the jig 1 according to the first embodiment.
Figure 10:
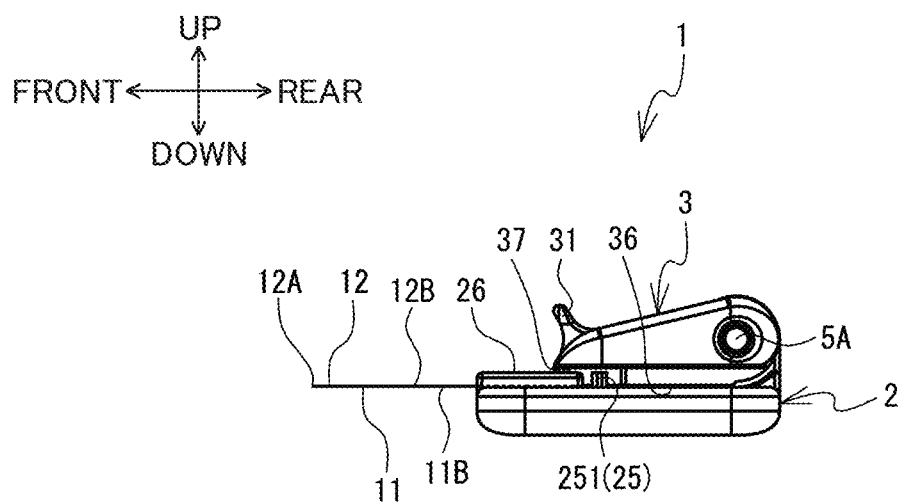
FIG. 10 is a right side view illustrating the state where the lower label 11 and the upper label 12 are nipped by the jig 1 according to the first embodiment.

As illustrated in FIGS. 1 through 3, when the pressure plate 3 is at the closed position relative to the base plate 2, the raised portion 36 of the pressure plate 3 is positioned directly above a region of the upper surface 21 of the base plate 2, the region being rearward of the first ribs 251-255; and the lower end face of the pressure rib 37 is in contact with the upper surface 21 of the base plate 2. The lower end of the pressure rib 37 is positioned slightly frontward of each rear end of each of the rectangular recesses 291-293, as illustrated in FIGS. 3 and 9.

As the pressure plate 3 at the closed position is pivoted rearward about the axes of the pivot shafts 5A, 5B relative to the base plate 2, the pressure plate 3 is moved to the open position as illustrated in FIGS. 4 through 6. At this time, the pressure plate 3 is inclined rearward relative to the base plate 2. In accordance with the rearward pivotal movement of the pressure plate 3 from the closed position to the open position, the lower end portion of the counterpart engagement plate 341 is brought into engagement with a rear surface of the engagement protrusion 24. Hence, the diagonally inclined posture of the pressure plate 3 relative to the base plate 2 can be maintained.

Figure 7:
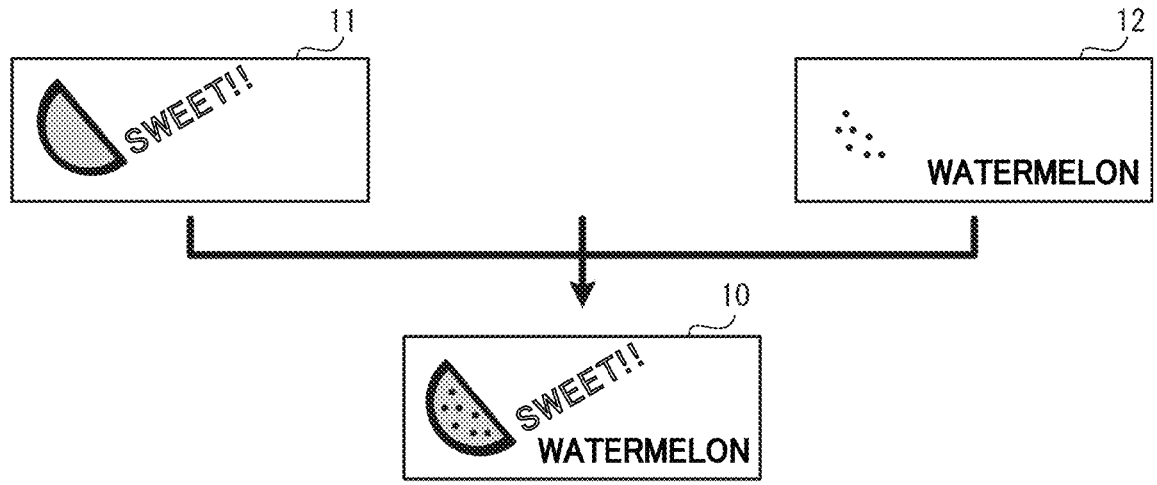
FIG. 7 is a view for description of a process of creating a laminated label 10 by superposing and bonding a lower label 11 and an upper label 12 together.

A structure of a laminated label 10 will be described next with reference to FIG. 7.

The laminated label 10 is produced by bonding a plurality of labels to each other in a superposed relation. In the present embodiment, the laminated label 10 is configured of the lower label 11 and the upper label 12. A printed image appearing on the laminated label 10 is based on a basic image intended by a user. The basic image is divided into two printing images, and each of the printing images is printed on a tape for each label 11, 12 by a label printer (not illustrated).

Incidentally, the tape for each label 11, 12 is an adhesive tape including a release sheet. The release sheet has a linear cut line P (see FIG. 8) extending along a widthwise center line of the release sheet. The release sheet is dividable along the linear cut line P into two sections with respect to a widthwise direction of the release sheet. In the present embodiment, the lower label 11 is a base label, and the upper label 12 is superposed on top of the lower label 11 and stuck thereto. The jig 1 according to the present embodiment is configured to provide accurate and easy positioning of the upper label 12 on top of the lower label 11, and to stick the accurately positioned upper label 12 to the lower label 11.

Next, a method for creating the laminated label 10 with the jig 1 according to the present embodiment will be described with reference to FIGS. 8 through 12.

Firstly, a user performs printing on each of the lower label 11 and the upper label 12, using the label printer (not illustrated), to prepare the printed lower label 11 and the printed upper label 12. The user the opens the jig 1, and places the lower label 11 and the upper label 12 on the label placement region 211 of the upper surface 21 of the base plate 2, such that the upper label 12 is laid over the lower label 11, as illustrated in FIG. 8. The user then brings respective rear edges of the lower label 11 and the upper label 12 into abutment with the first ribs 251-255. Respective right edges of the lower label 11 and upper label 12 superposed on the lower label 11, more specifically, a right edge 11B of the lower label 11 (FIGS. 10-11B) and a right edge 12B of the upper label 12 (FIGS. 9-111B), are then brought into abutment with the second rib 26 on the upper surface 21 of the base plate 2. Hence, positions of rear-right corners of the lower label 11 and the upper label 12 are aligned with each other, and accordingly, a contour of the lower label 11 can be easily aligned with a contour of the upper label 12.

Then, the user pivotally moves the pressure plate 3 toward the upper surface 21 of the base plate 2 to close the jig 1 in a state where the contours of the lower label 11 and the upper label 12 are aligned with each other on the label placement region 211 (see FIG. 9). As a result, the lower label 11 and the upper label 12 are pressed from above, by the pressure rib 37 of the pressure plate 3, on the label placement region 211 of the upper surface 21 of the base plate 2.

At this time, the four magnetic bodies 381-384 on the lower surface 35 of the pressure plate 3 are magnetically attracted to the four magnets 271-271 on the upper surface 21 of the base plate 2. Hence, rear end portions of the lower label 11 and the upper label 12 are nipped tight between the magnetic bodies 381-384 and the magnets 271-274, since the magnets 271-274 are positioned along the rear end portion of the label placement region 211. In this state, a part of a peripheral portion of the upper label 12 (specifically, the part including: a front end portion including a front edge 12A; and a front-right corner portion including the right edge 12B but excluding the rear-right corner portion of the upper label 12) are exposed to an outside of the jig 1, as illustrated in FIG. 9.

Here, the peripheral portion of the upper label 12 implies an entire peripheral edge portion of the upper label 12. That is, the peripheral portion implies an outer edge (contour) of the upper label 12 and a surface of the upper label 12 that can be seen in a plan view, i.e., when viewed in a direction perpendicular to the surface of the upper label 12. The front edge 12A and the right edge 12B are parts of the contour of the upper label 12.

As illustrated in FIG. 8, the label placement region 211 has a length L1 in the frontward/rearward direction that is shorter than a length L2 in the frontward/rearward direction (i.e., the width) of the lower label 11 and the upper label 12. Preferably, the length L1 of the label placement region 211 is shorter than one-half of the length L2 of the lower label 11 and upper label 12 (indicated as a length L3 in FIG. 8). Hence, the cut line P formed in the release sheet of each of the upper label 12 and the lower label 11 is positioned forward of the front edge of the upper surface 21 of the base plate 2 (see FIGS. 8 and 9).

That is, a region of the upper label 12 between the front edge 12A and the cut line P in the frontward/rearward direction is positioned forward of the base plate 2 and thus protrudes out forward from the base plate 2. This region of the upper label 12 is included in the exposed part of the peripheral portion of the upper label 12 including: the front end portion (front edge 12A) of the upper label 12; and the front-right corner portion of the upper label 12 other than the rear-right corner portion thereof. Hence, the user can easily flip up this exposed region of the upper label 12 relative to the lower label 11.

Here, preferably, the exposed part of the peripheral portion of the upper label 12 include: the front end portion including the front edge 12A; and the portion including the right edge 12B and excluding the rear right corner portion, so that the front end portion of the upper label 12 (which is opposite the rear end portion nipped between the base plate 2 and pressure plate 3) becomes a free end portion of the upper label 12. With this configuration, since the front right corner portion of the upper label 12 defined by the front edge 12A and the right edge 12B is contained in the exposed part, the user can flip up the exposed free end portion (free end portion) of the upper label 12 including the front right corner portion.

Figure 11A:
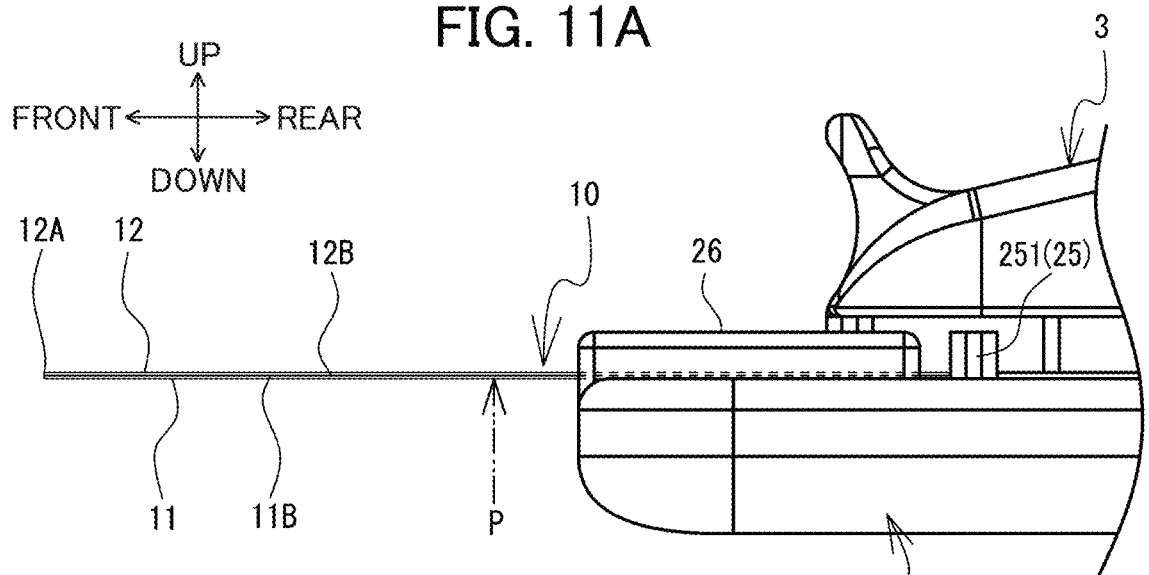
FIGS. 11A and 11B are views for description of a process to flip the upper label 12 from the state where the upper label 12 and lower label 11 are nipped by the jig 1 according to the first embodiment.
Figure 11B:
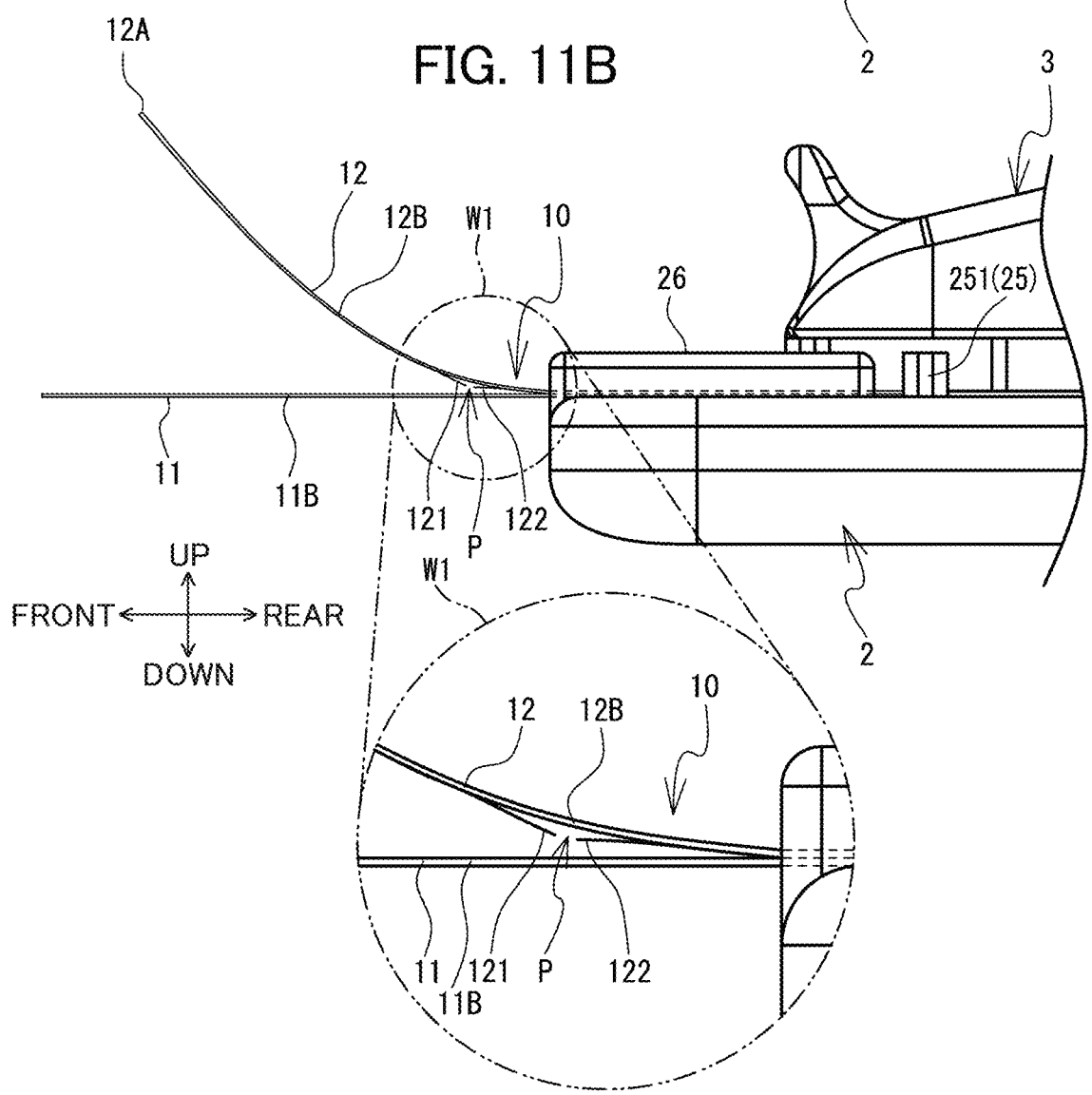

As illustrated in FIG. 11B, the user flips up only the front end portion of the upper label 12 relative to the lower label 11. Since the region of the upper label 12 from the front edge 12A to the cut line P is exposed and protrudes out relative to the base plate 2, the release sheet of the upper label 12 is segmentalized into a front half section and a rear half section at the cut line P because of tensility (or linearity) of the release sheet itself. Hence, respective cut edge portions 121 and 122 of the front and rear half sections are separated from the adhesive sheet of the upper label 12. Then, the user peels the front half section of the release sheet off the adhesive sheet, and affixes a front half portion of the adhesive sheet of the upper label 12 (from which the front half section of the release sheet is peed off) to the upper surface of the lower label 11.

The user then takes out the lower label 11 and the upper label 12 together from the jig 1 with the front end portion of the upper label 12 bonded to the lower label 11. At this time, due to the bonding of the front end portion of the upper label 12 to the lower label 11, positional relationship between the lower label 11 and the upper label 12 is maintained. Then, the user peels off the rear half section of the release sheet from the adhesive sheet of the upper label 12, and bonds a rear half section (peel-off section) of the adhesive sheet of the upper label 12 to the upper surface of the lower label 11. In this way, with employment of the jig 1, the lower label 11 and the upper label 12 are stuck to each other with the contours of the lower label 11 and the upper label 12 aligned with each other. The user can thus easily create the laminated label 10 using the jig 1 according to the present embodiment.

As described above, the lower label 11 and the upper label 12 of the present embodiment have such widths that the front end portions of the labels 11 and 12 protrude frontward relative to the label placement region 211 of the base plate 2. Here, assume a case where upper and lower labels whose widths are smaller than the width (front-rear length) of the label placement region 211 are nipped by the jig 1. In this case, front edges of the upper and lower labels are positioned rearward of the front edge of the label placement region 211. However, at this time, front end portions (front edges) of the upper and lower labels are positioned directly above the rectangular recesses 291-293 on the upper surface 21 of the base plate 2.

Accordingly, a gap is formed between the front end portions of the upper and lower labels and a bottom surface of each rectangular recess 291-293, so that the user can insert his finger in the gap for hooking the front end portions of the upper and lower labels. Through this gap, the user can insert his finger to hook the front end portion of the upper label and the front end portion of the lower label, respectively, so that the user can easily flip up the front end portion of the upper label 12 from the lower label 11.

As described above, the jig 1 according to the first embodiment is used for sticking the upper label 12 to the lower label 11 after superposing the upper label 12 on top of the lower label 11 in a thickness direction of the labels 11 and 12. Each of the lower label 11 and the upper label 12 includes the adhesive sheet and the release sheet adhered thereto. The jig 1 includes the base plate 2 and the pressure plate 3. On the upper surface 21 of the base plate 2, the first ribs 25 (251-255) and the second rib 26 are provided. The first ribs 25 (251-255) are configured to be contacted by the rear edges of the lower label 11 and the upper label 12 superposed with each other, thereby serving to regulate the respective positions of the rear edges of the upper label 12 and the lower label 11. The second rib 26 is configured to be contacted by the right edge 12B of the upper label 12 and the right edge 11B of the lower label 11, thereby serving to regulate the respective positions of the right edges 12B, 11B of the upper label 12 and the lower label 11. The base plate 2 and the pressure plate 3 are configured to nip therebetween the rear end portions of the upper label 12 and the lower label 11 superposed with each other in the thickness direction of the upper and lower labels 12, 11 to fix the positions of the upper and lower labels 12, 11.

In this way, the jig 1 can accurately and easily even up the edges of the upper and lower labels 12, 11 in two directions perpendicular to each other, since the rear edge and right edge of the upper label 12 can be physically aligned with the rear edge and right edge of the lower label 11 with the superposed relation. The jig 1 is configured to nip the rear end portions of the upper and lower labels 12, 11 aligned with each other from both sides in the thickness direction of the labels 12, 11 to fix the positions of the upper and lower labels 12, 11. Hence, even if the user flips up the front end portion of the upper label 12 from the lower label 11, positional displacement of the upper label 12 relative to the lower label 11 does not occur. The user flips up the front end portion of the upper label 12, peels off the front half section of the release sheet, and bonds the front half region of the adhesive sheet of the upper label 12 to the lower label 11. The user then takes out the upper and lower labels 12, 11 from the jig 1. After removing the upper and lower labels 12 and 11 from the jig 1, the user can peel off the rear half section of release sheet, and bonds the rear half region (peeled-off region) of the adhesive sheet of the upper label 12 to the lower label 11 to create the laminated label 10.

In the jig 1 according to the first embodiment, the upper surface 21 of the base plate 2 is provided with the four magnets 271-274, and the lower surface 35 of the pressure plate 3 is provided with the four magnetic bodies 381-384. Hence, the jig 1 can securely nip the rear end portions of the stacked upper and lower labels 12 and 11 in the thickness direction of the labels 11, 12 by the magnetic force of the magnets 271-274.

In the jig 1, the base plate 2 and the pressure plate 3 are pivotally connected to each other by the hinges 22 and 23 so that the jig 1 can be opened and closed. Hence, a uniform nipping force can be provided by the base plate 2 and pressure plate 3 along the length of the jig 1. Further, enhanced portability of the jig 1 can be provided, since the hinges 22 and 23 prevent separation between the base plate 2 and the pressure plate 3.

The upper surface 21 of the base plate 2 provides the label placement region 211. In the closed state of the pressure plate 3 relative to the base plate 2, only the rear end portions of the upper and lower labels 12, 11 superposed and placed on the label placement region 211 are nipped between the base plate 2 and pressure plate 3. That is, in the closed state of the pressure plate 3 relative to the base plate 2, the base plate 2 faces a limited region (including the rear end portion) of the lower label 11 placed on the label placement region 211; and the pressure plate 3 faces a limited region (including the rear end portion) of the upper label 12 placed on the label placement region 211. With structure, since the user can flip up only the upper label 12 to peel off the front half section of the release sheet, the user can easily perform sticking of the upper label 12 to the lower label 11.

In the above-described embodiment, the upper and lower labels 12, 11 have a shape and a size identical to each other. However, only a part of the upper label 12 may have a shape and a size identical to those of a corresponding part of the lower label 11. Alternatively, the upper label 12 may be sized to be within an area of the lower label 11 (i.e., an entirety of the upper label 12 may be smaller in size than the lower label 11). Still alternatively, parts of the upper and lower labels 12 and 11 whose shape and size are coincident with each other may be abutted against the first ribs 251-255 and the second rib 26 in order to regulate the respective positions of the upper and lower labels 12 and 11. Thus, the upper and lower labels 12 and 11 can be superposed with each other with accurate positional alignment therebetween.

With regard to the first embodiment, the upper label 12 is an example of a "first sheet" of the disclosure. The lower label 11 is an example of a "second sheet". The rear edges of the upper label 12 and the lower label 11 superposed with each other are examples of a "first edge", and a "second edge", respectively. The right edges 12B, 11B of the upper label 12 and the lower label 11 superposed with each other are examples of a "third edge", and a "fourth end region", respectively. The first ribs 25 (251-255) and the second rib 26 provided on the upper surface 21 of the base plate 2 are examples of a "first regulating portion", and a "second regulating portion", respectively. The base plate 2 and the pressure plate 3 are examples of a "nipper" and "a pair of abutment portions". The base plate 2 is also an example of a "second abutment portion". The pressure plate 3 is also an example of a first abutment portion. The label placement region 211 on the upper surface 21 of the base plate 2 is an example of a "placement region". The hinges 22, 23 are examples of a "hinge portion". The cut line P is an example of a "cut line". The magnets 271-274 and the magnetic bodies 381-384 are examples of a "pressing-force application portion."

Second Embodiment

A jig 200 according to a second embodiment will next be described with reference to FIGS. 12 through 15, wherein like parts and components are designated by the same reference numerals as those of the first embodiment shown in FIGS. 1 through 11B to avoid duplicating description.

In the jig 1 according to the first embodiment, the magnetic force of the magnets 271-274 is utilized for urging the pressure plate 3 to the base plate 2 for closing the pressure plate 3. In contrast, the jig 200 according to the second embodiment does not include the magnets 271-274 nor the magnetic bodies 381-384 (FIG. 4). Instead, the jig 200 of the second embodiment includes a helical torsion spring 260 whose urging force is utilized for closing the jig 200.

Figure 12:
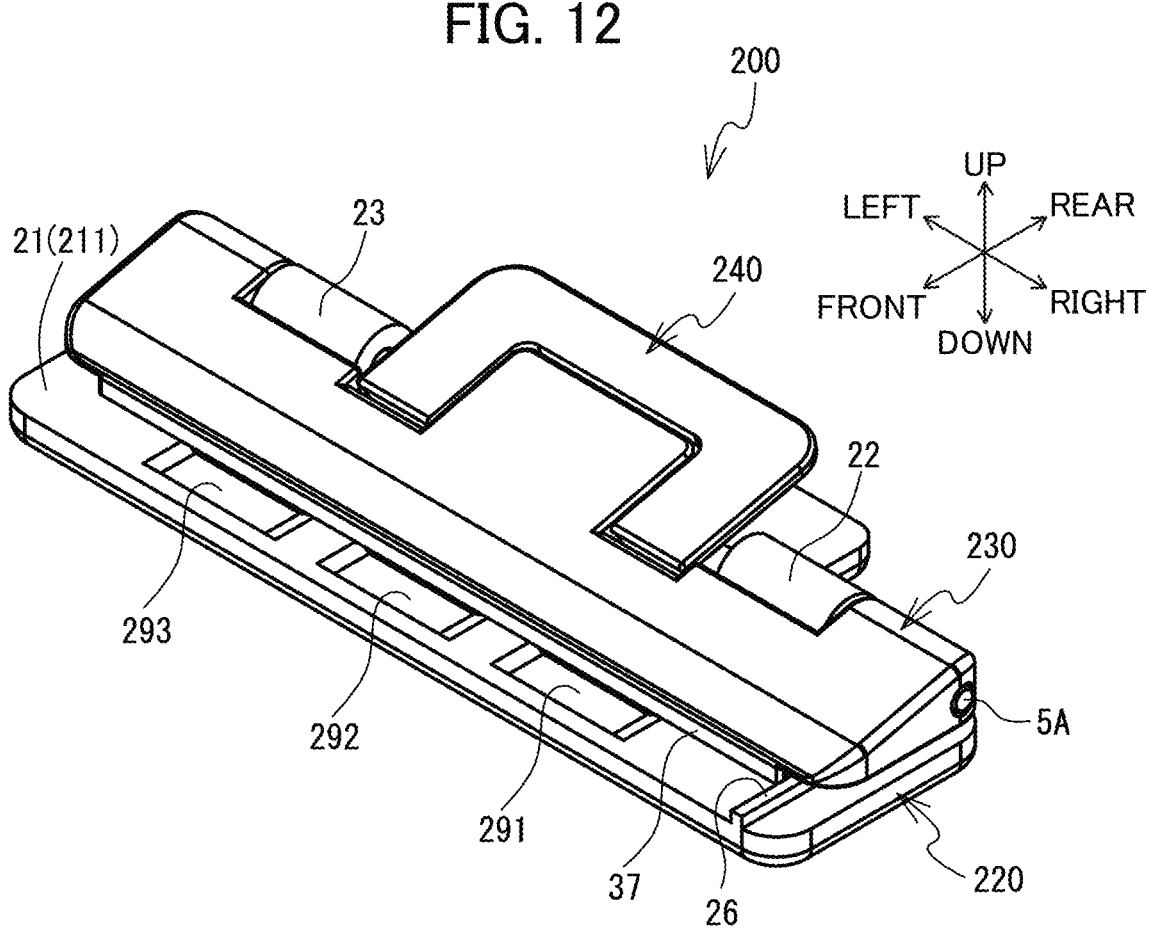
FIG. 12 is a perspective view of a jig 200 according to a second embodiment of the disclosure, wherein the jig 200 is in a pressure application state.
Figure 15:
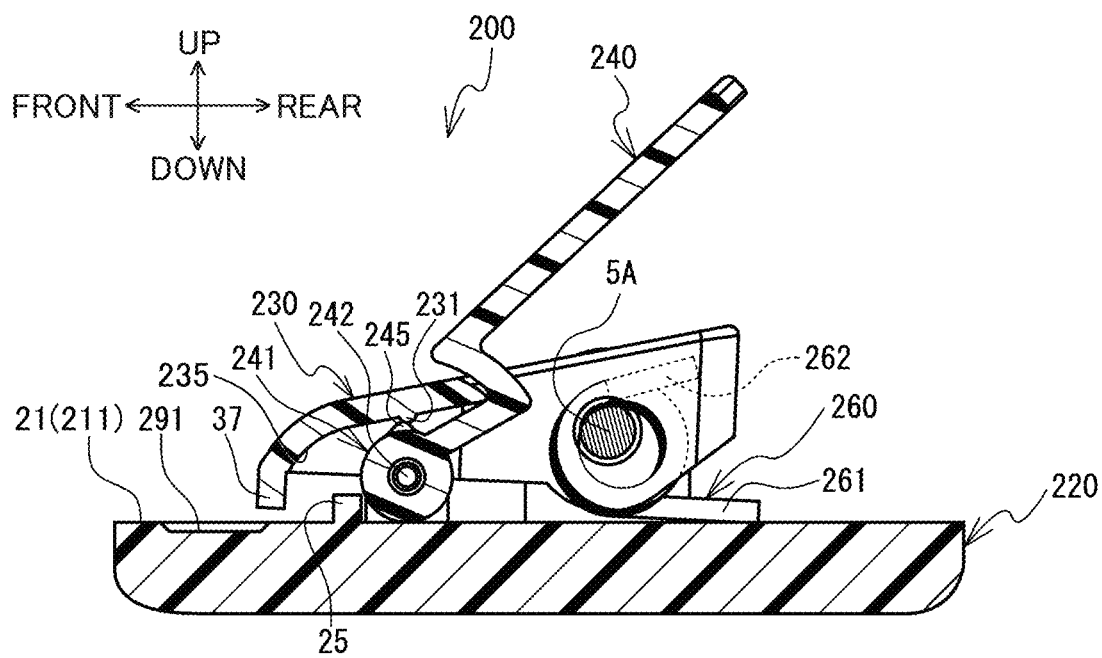
FIG. 15 is a cross-sectional view of the jig 200 according to the second embodiment in the pressure release state.

As illustrated in FIG. 12, the jig 200 includes a base plate 220 and a pressure plate 230. The base plate 220 has approximately the same configuration as the base plate 2 of the first embodiment. However, the magnets 271-274 are not provided on the upper surface 21 of the base plate 220. The pressure plate 230 has, at least partially, a common structure as the pressure plate 3 of the first embodiment. However, the magnetic bodies 381-384 are not provided on a lower surface 235 of the pressure plate 230. The pressure plate 230 is pivotally movably connected to the base plate 220 through the hinges 22 and 23 of the base plate 220, as in the first embodiment. However, pivotally movable stroke of the pressure plate 230 about the axis of the pivot shaft 5A is restricted within a predetermined range and is smaller than that of the pressure plate 3 of the first embodiment. As illustrated in FIG. 15, even at the open position of the pressure plate 230, the lower end surface of the pressure rib 37 of the pressure plate 230 is positioned below the upper end of the first rib 25 provided on the upper surface 21 of the base plate 220.

Figure 13:
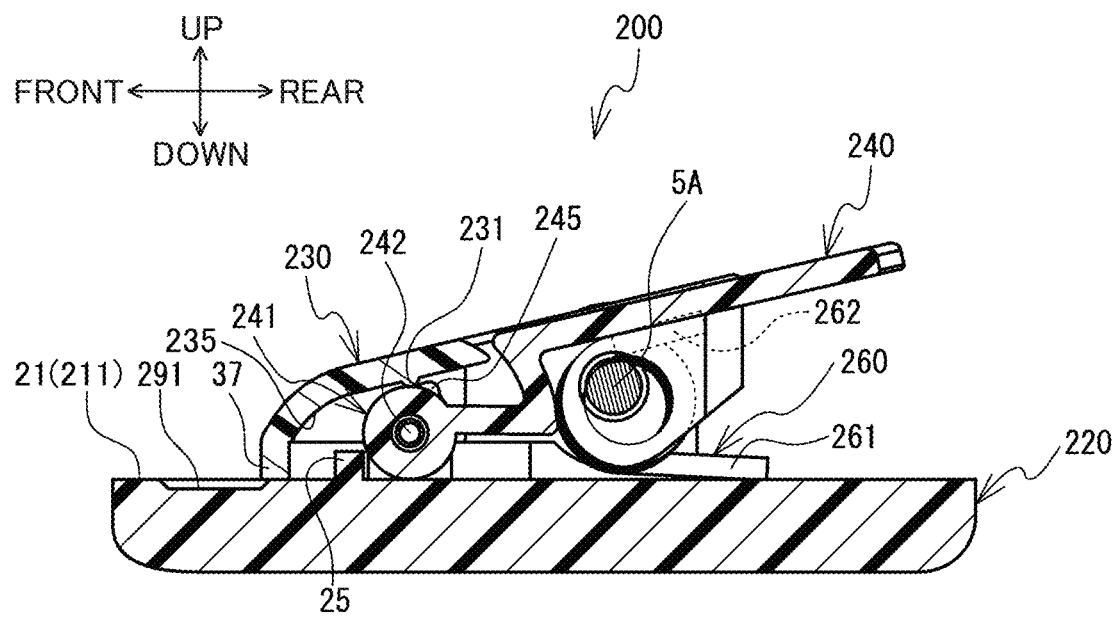
FIG. 13 is a cross-sectional view of the jig 200 according to the second embodiment in the pressure application state.

Specifically, the pressure plate 230 includes a lever 240 having a generally U shape. As illustrated in FIG. 13, the lever 240 has a base end portion positioned below the front end portion of the pressure plate 230, and is rotatably supported by a pivot shaft 242 provided at the base plate 220. Hence, the lever 240 is pivotally movable about an axis of the pivot shaft 242. The pivot shaft 242 extends in the leftward/rightward direction and is supported by the base plate 220 at a position above the upper surface 21. The pivot shaft 242 is positioned frontward of the pivot shaft 5A.

The base end portion of the lever 240 includes a sleeve portion 241 extending along the pivot shaft 242. The sleeve portion 241 has an outer peripheral surface whose upper portion is provided with a cam 245 protruding radially outward therefrom. A protrusion 231 is provided on a front end portion of the lower surface 235 of the pressure plate 230 to protrude downward therefrom at a position corresponding to the position of the sleeve portion 241. As illustrated in FIGS. 12 and 13, in a state where the lever 240 is depressed downward, the cam 245 is positioned rearward of the protrusion 231.

The helical torsion spring 260 is disposed over the support shaft 5A. The helical torsion spring 260 has one end portion seated on the upper surface 21 of the base plate 220, and another end portion seated on the lower surface 235 of the pressure plate 230. Hence, the helical torsion spring 260 normally urges a rear portion of the pressure plate 230 upward, so that the pressure rib 37 at the front portion of the pressure plate 230 is pressed against the upper surface 21 of the base plate 2. That is, the pressure plate 230 is normally at the closed position when no external force is applied thereto.

Figure 14:
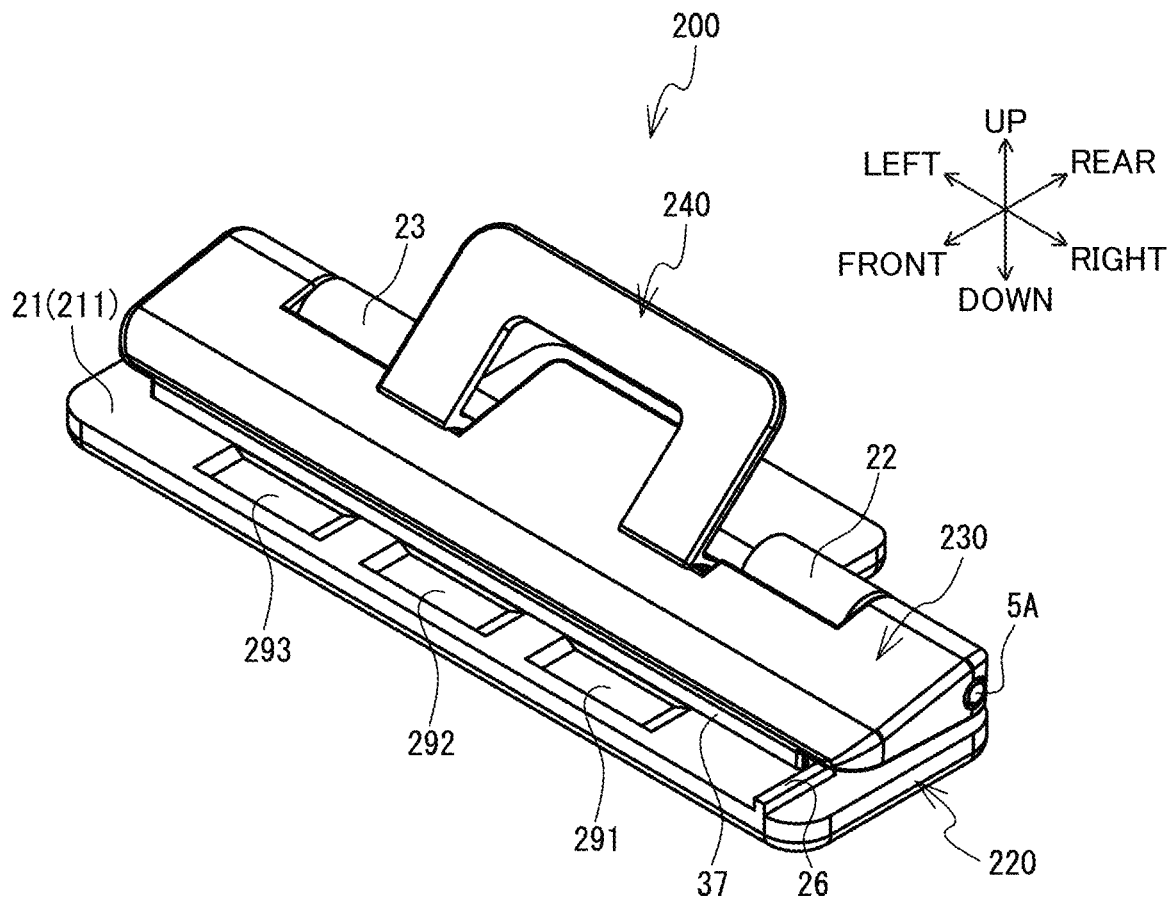
FIG. 14 is a perspective view of the jig 200 according to the second embodiment, wherein the jig 200 is in a pressure release state.

As illustrated in FIGS. 14 and 15, pulling up of the lever 240 causes angular rotation of the sleeve portion 241 in a counterclockwise direction in a right side view, so that the cam 245 pushes up the protrusion 231 and is moved frontward of the protrusion 231. Accordingly, the pressure plate 230 is pivotally moved about the axis of the pivot shaft 5A in a clockwise direction (in a right side view) against the urging force of the helical torsion spring 260. As a result, the front end portion of the pressure plate 230 is moved upward, and the pressure rib 37 is lifted upward to be separated from the upper surface 21 of the base plate 220. At this time, a gap length between the upper surface 21 and the lower surface of the pressure rib 37 is adjusted to be greater than a sum of the thickness of the lower label 11 and the upper label 12. In this state, the lower surface of the pressure rib 37 is positioned lower than the upper end surface (top surface) of the first rib 25.

While the user pulls up the lever 240 to maintain the lift-up position of the front end portion of the pressure plate 230 (to maintain the open position of the pressure plate 230), the user places the upper and lower labels 12, 11 on the label placement region 211 of the upper surface 21 of the base plate 220, and brings the upper and lower labels 12, 11 into abutment with the first ribs 25 (251-255) and the second rib 26 for positioning. Then, the user pushes down the lever 240, thereby moving the cam 245 to the position rearward of the protrusion 231, so that the front end portion of the pressure plate 230 is moved downward by the urging force of the helical torsion spring 260. The pressure rib 37 thus presses the rear end portions of the stacked upper and lower labels 12, 11 against the upper surface 21. Hence, similar to the first embodiment, the jig 200 according to the second embodiment can nip the lower label 11 and the upper label 12 between the base plate 220 and the pressure plate 230.

In the jig 200 according to the second embodiment, the lower surface of the pressure rib 37 is positioned lower than the upper end surfaces of the first ribs 25 even when the pressure plate 230 is at the open position, i.e., even when the front end portion of the pressure plate 230 is lifted up in response to the user's pulling up of the lever 240. With this structure, the rear edges of the lower and upper labels 11, 12 cannot move over the first ribs 25. Hence, accurate abutment of the rear edges of the lower and upper labels 11, 12 on the first ribs 25 can be attained.

With respect to the second embodiment, the helical torsion spring 260 is an example of the "pressing-force application portion".

Third Embodiment

Figure 16:
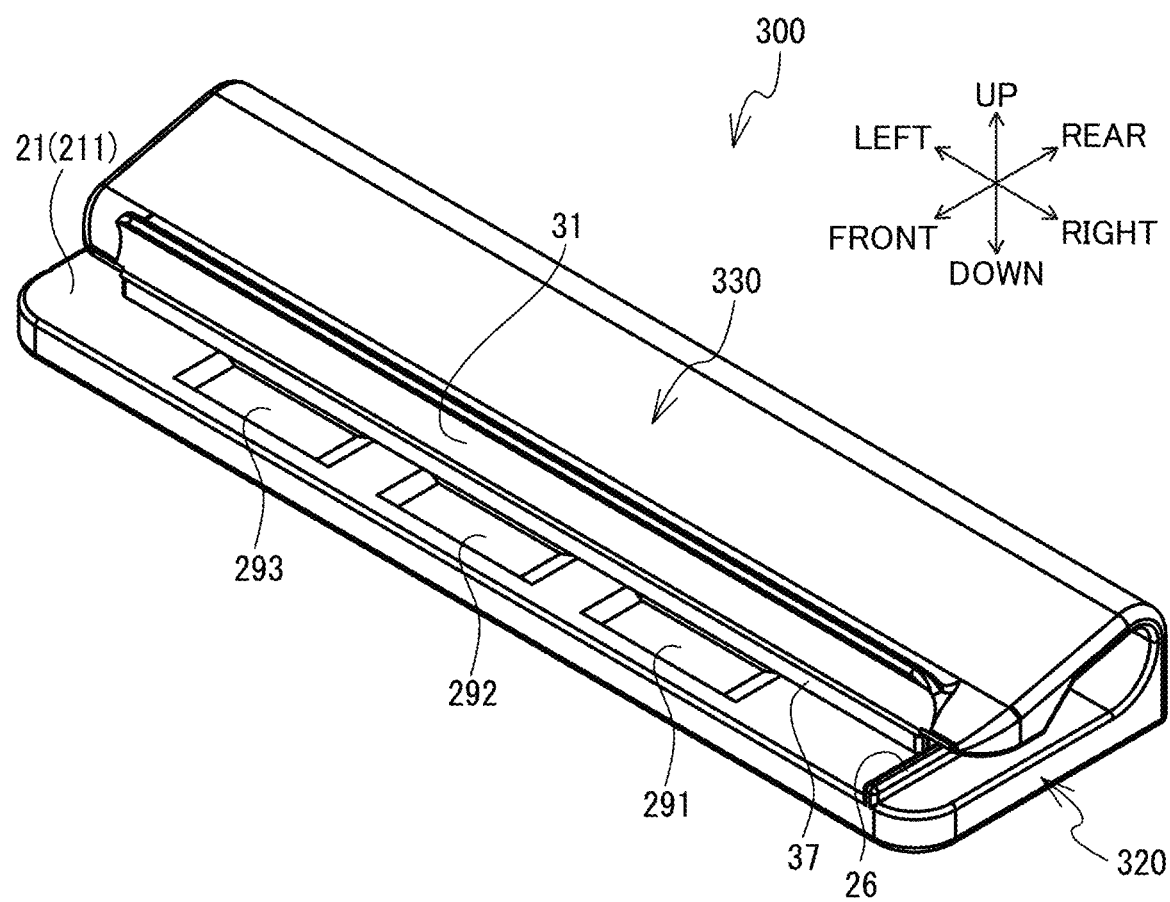
FIG. 16 is a perspective view of a jig 300 according to a third embodiment of the disclosure.

A jig 300 according to a third embodiment will be described with reference to FIG. 16, wherein like parts and components are designated by the same reference numerals as those of the first embodiment shown in FIGS. 1 through 11B to avoid duplicating description.

In the jig 1 according to the first embodiment, the base plate 2 and the pressure plate 3 are pivotally movably connected to each other through the hinges 22 and 23. In contrast, the jig 300 according to the third embodiment has an elastic clipping structure configured of a base plate 320 and a pressure plate 330 that are integrally with each other.

The base plate 320 of the third embodiment is different from the base plate 2 of the first embodiment in that neither the magnets 271-274 nor the hinges 23 and 22 are not provided on the upper surface 21 of the base plate 320. Hence, the magnetic bodies 381-384 of the first embodiment are not provided on the lower surface of the pressure plate 330. A rear end portion of the pressure plate 330 is directly connected to a rear end portion of the base plate 320 to form a general U-shape in a side view. The base plate 320 and the pressure plate 330 are molded integrally with resin. The pressure rib 37 of the pressure plate 330 is normally pressed against the upper surface 21 of the base plate 320 because of elasticity of the integral resin product.

A user holds down the base plate 320 with his one hand, and pulls up the operating portion 31 provided at the front end portion of the pressure plate 330 with his another hand against the elastic force. Hence, the pressure rib 37 is separated and moved upward from the upper surface 21 of the base plate 320. Then, the user places the lower and upper labels 11, 12 on the label placement region 211 of the upper surface 21 of the base plate 320, and fixes the positions of the both labels 11 and 12 along the first ribs 25 and the second rib 26. As the user gradually releases his upward pulling force applied to the operating portion 31, the jig 300 restores its original shape because of the elasticity of the resin. The pressure rib 37 presses the rear end portions of the lower and upper labels 11, 12 on the upper surface 21. Hence, similar to the first and second embodiments, the jig 300 according to the third embodiment can nip the lower label 11 and the upper label 12 between the base plate 320 and the pressure plate 330.

Fourth Embodiment

A jig 400 according to a fourth embodiment will be described with reference to FIGS. 17A through 21B, wherein like parts and components are designated by the same reference numerals as those of the first embodiment shown in FIGS. 1 through 11B to avoid duplicating description.

In the jig 1 according to the first embodiment, the pressure plate 3 is urged toward the base plate 2 in a direction for closing the pressure plate 3 by making use of the magnetic force of the magnets 271-274. In contrast, the jig 400 according to the fourth embodiment employs a toggle mechanism to urge a pressure plate 430 toward a base plate 420 for closing the pressure plate 430.

Figure 17A:
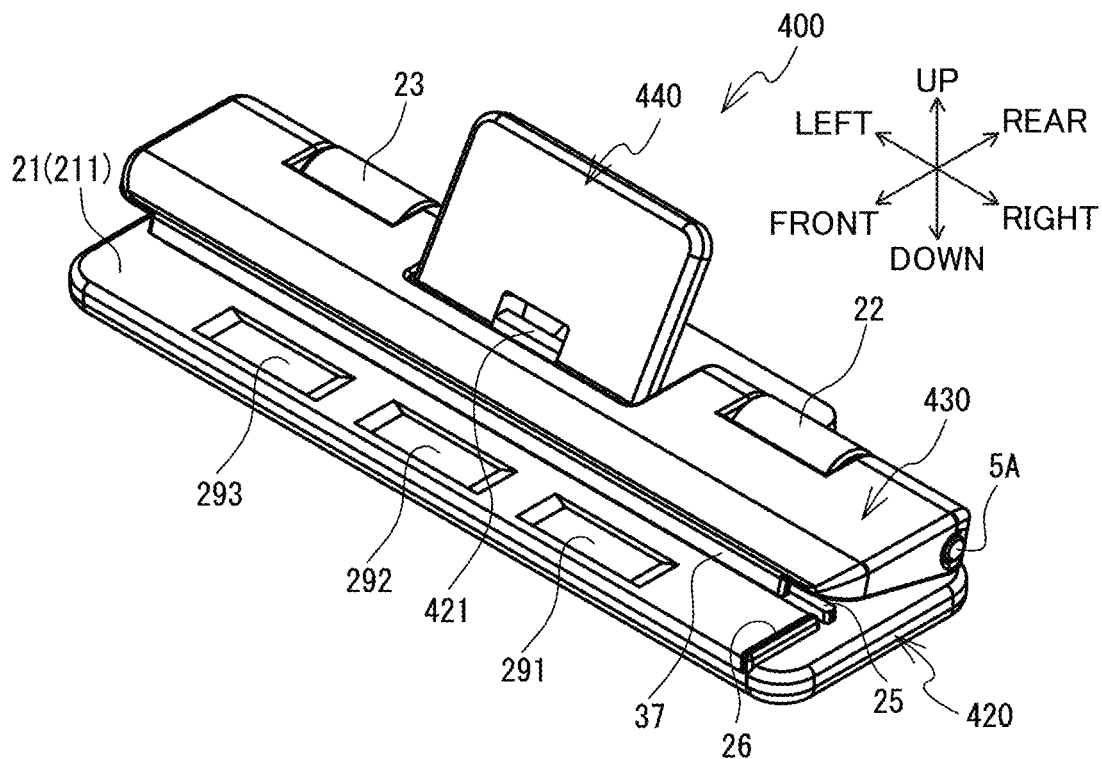
FIG. 17A is a perspective view of a jig 400 according to a fourth embodiment of the disclosure, wherein the jig 400 is in a pressure release state.

As illustrated in FIG. 17A, the base plate 420 has a similar structure to that of the base plate 2 of the first embodiment, but the base plate 420 is different from the base plate 2 in that the upper surface 21 of the base plate 420 is not provided with the magnets 271-274. The pressure plate 430 has, at least partially, a similar structure to those of the pressure plate 3. However, the magnetic bodies 381-384 of the first embodiment are not provided on the lower surface of the pressure plate 430. Further, the pressure plate 430 is pivotally movably connected to the base plate 420 through the hinges 22 and 23 of the base plate 420. However, pivotally movable stroke of the pressure plate 430 about the axis of the pivot shaft 5A (the axis of pivot shaft 5B) is restricted within a predetermined range and is smaller than that of the pressure plate 3.

The jig 400 of the fourth embodiment includes a lever 440 for pivotally moving the pressure plate 430 relative to the base plate 320.

Specifically, in the jig 400 according to the fourth embodiment, a boss 421 upstands from the upper surface 21 of the base plate 420 as illustrated in FIG. 17A at a center portion in the leftward/rightward direction of the upper surface 21. A rotation shaft 441 extending in the leftward/rightward direction is supported by an upper portion of the boss 421 (see FIG. 17B). The rotation shaft 441 is positioned frontward of the respective pivot shafts 5A and 5B.

Figure 17B:
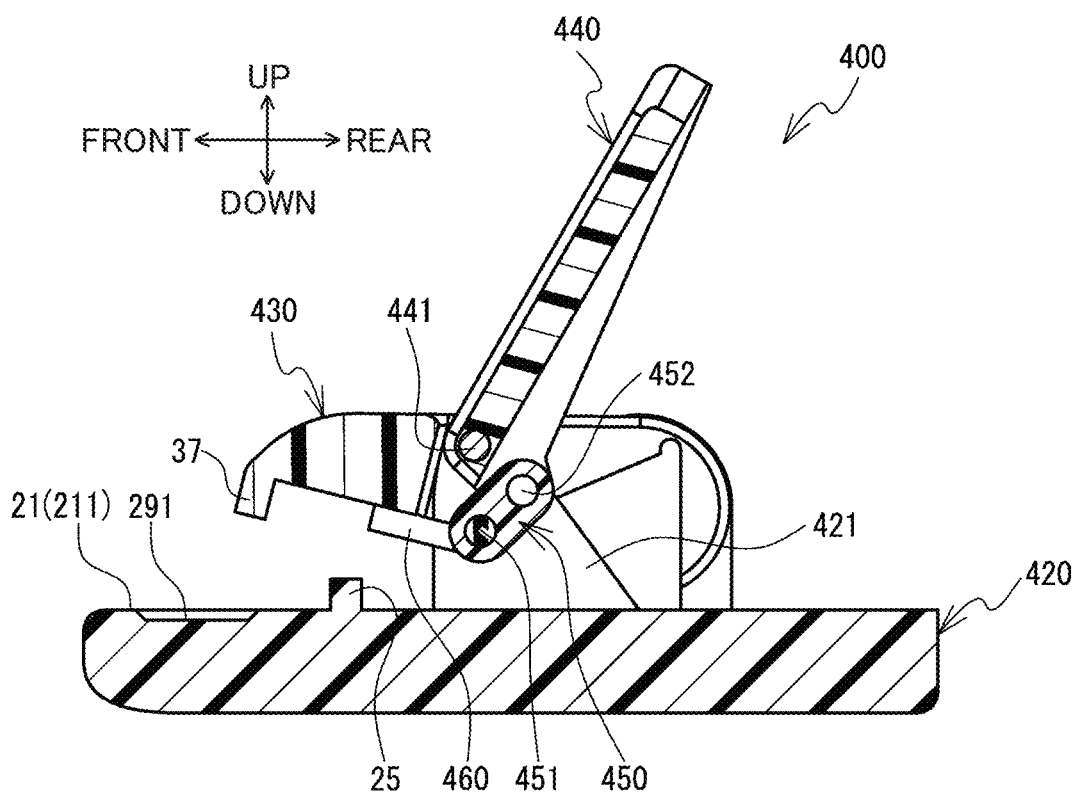
FIG. 17B is a cross-sectional view of the jig 400 according to the fourth embodiment in the pressure release state.

The lever 440 has a generally rectangular plate-like shape. Referring to FIG. 17B, the lever 440 has a base end portion positioned below the front end portion of the pressure plate 430, and is rotatably supported by the rotation shaft 441. Further, a link member 450 having an elongated elliptic shape in a side view is connected to the base end portion of the lever 440 and the pressure plate 430.

Specifically, a first connecting pin 452 extends outward in the leftward/rightward direction from the base end portion of the lever 440. The first connecting pin 452 is positioned below the rotation shaft 441. One longitudinal end portion of the link member 450 is rotatably connected to the first connecting pin 452.

A connecting plate 460 extends rearward from the front end portion of the lower surface of the pressure plate 430. The connecting plate 460 is positioned rearward of the pressure rib 37. A second connecting pin 451 extends outward in the leftward/rightward direction from a rear end portion of the connecting plate 460. Another longitudinal end portion of the link member 450 is rotatably connected to the second connecting pin 451. That is, the pressure plate 430 is connected to the lever 440 through the link member 450. The rotation shaft 441, the link member 450, the first connecting pin 452, and the second connecting pin 451 constitute in combination a toggle mechanism configured to permit the pressure rib 37 of the pressure plate 430 to press against the upper surface 21 of the base plate 420 in accordance with a user's operation to the lever 440.

As illustrated in FIG. 17A, in a state where the lever 440 is at a pulled up position, the first connecting pin 452 is positioned rearward of the rotation shaft 441 and the second connecting pin 451. That is, a combination of a first line segment connecting the rotation shaft 441 to the first connecting pin 452 and a second line segment connecting the first connecting pin 452 to the second connecting pin 451 constitutes an L-shape bent at the first connecting pin 452. At this time, a combination of the link member 450 and the connecting plate 460 forms a general V shape bent at the second connecting pin 451. The front end portion of the pressure plate 430 is thus lifted up by the connecting plate 460. Hence, the pressure rib 37 of the pressure plate 430 is moved upward away from the upper surface 21 of the base plate 420. Accordingly, pressing force from the pressure rib 37 against the upper surface 21 of the base plate 420 is released.

Figure 18A:
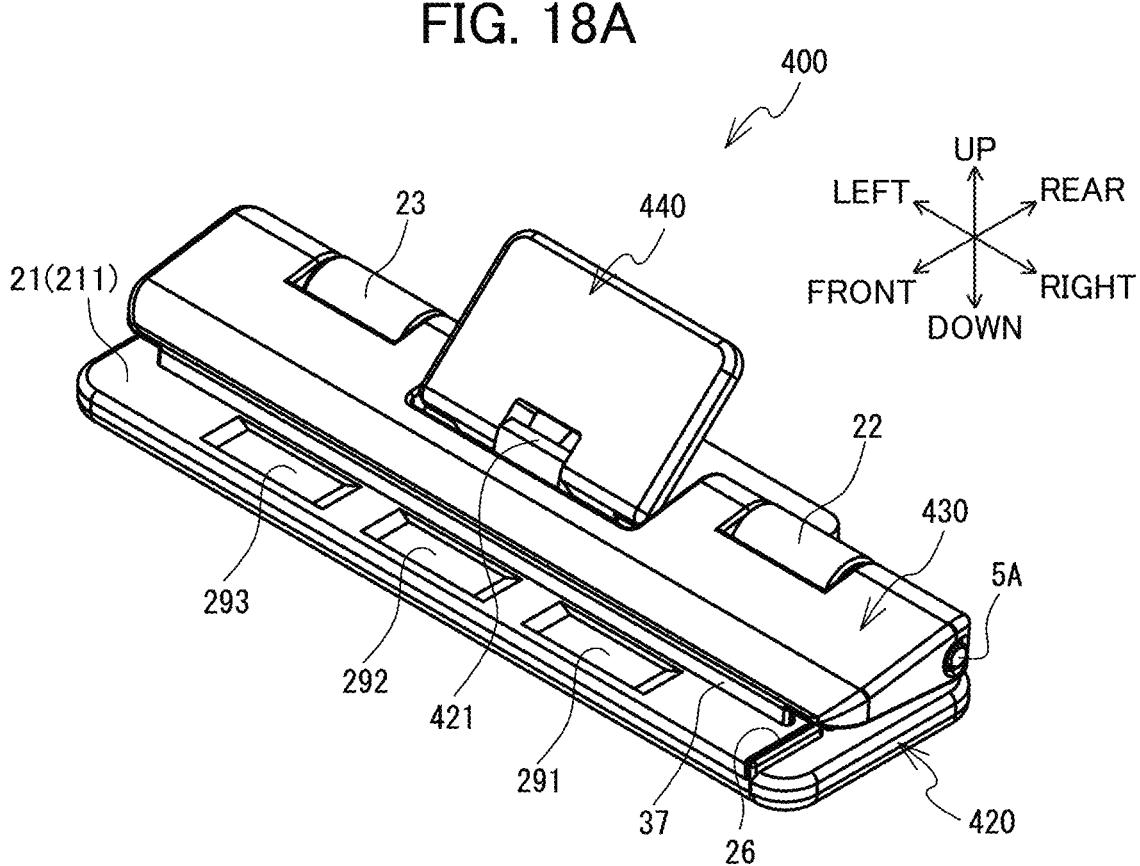
FIG. 18A is a perspective view of the jig 400 according to the fourth embodiment and illustrating a state where a lever 440 is moved down from the state illustrated in FIG. 17A.
Figure 18B:
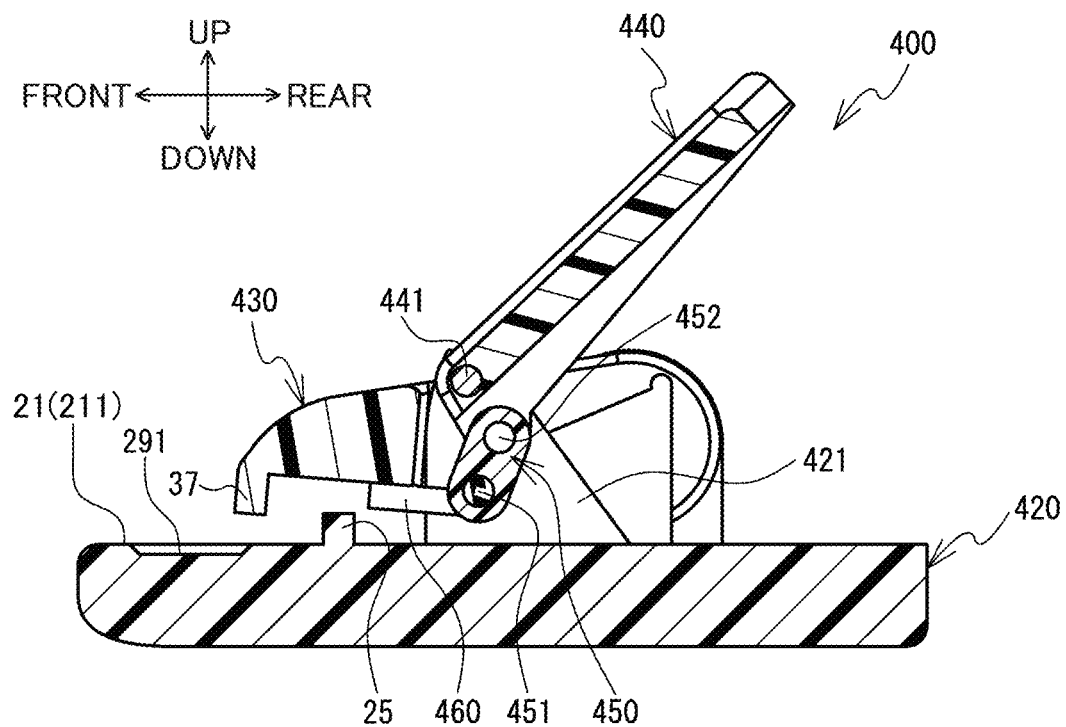
FIG. 18B is a cross-sectional view of the jig 400 according to the fourth embodiment and illustrating the state where the lever 440 is moved down from the state illustrated in FIG. 17B.
Figure 19A:
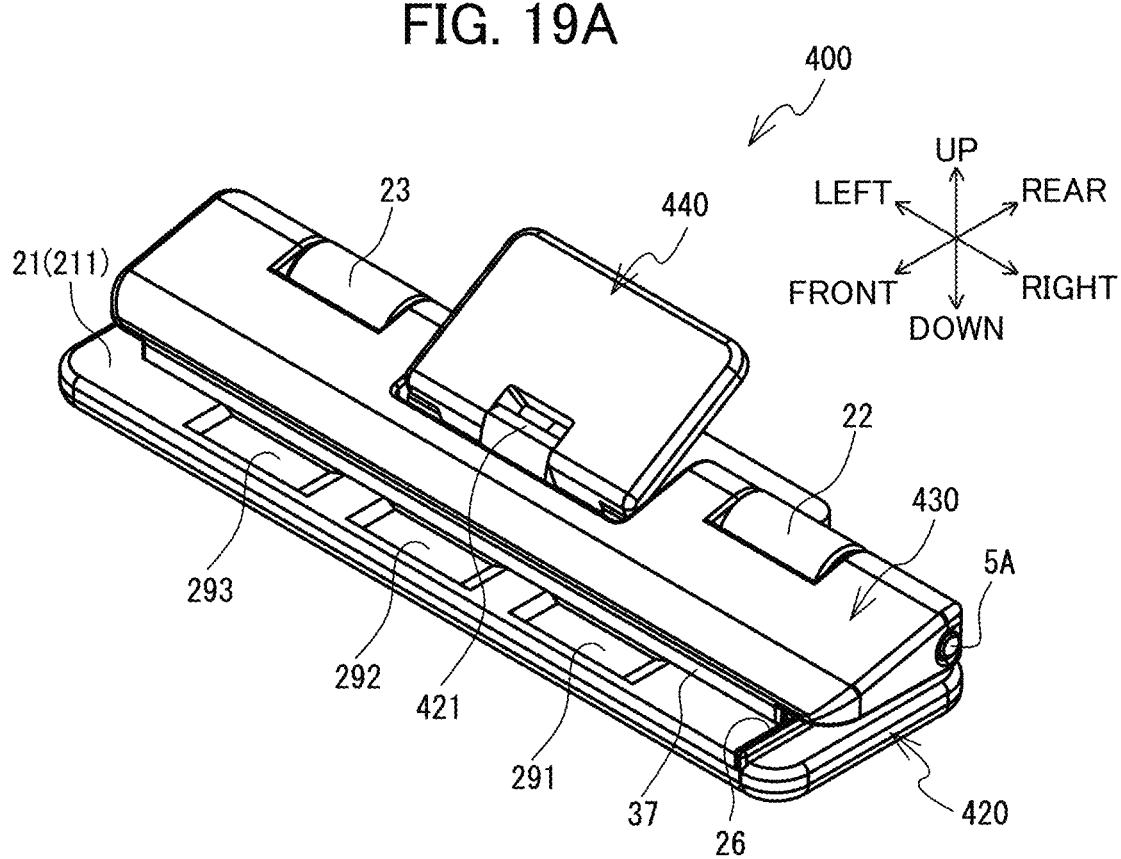
FIG. 19A is a perspective view of the jig 400 according to the fourth embodiment and illustrating a state where the lever 440 is further moved down from the state illustrated in FIG. 18A.
Figure 19B:
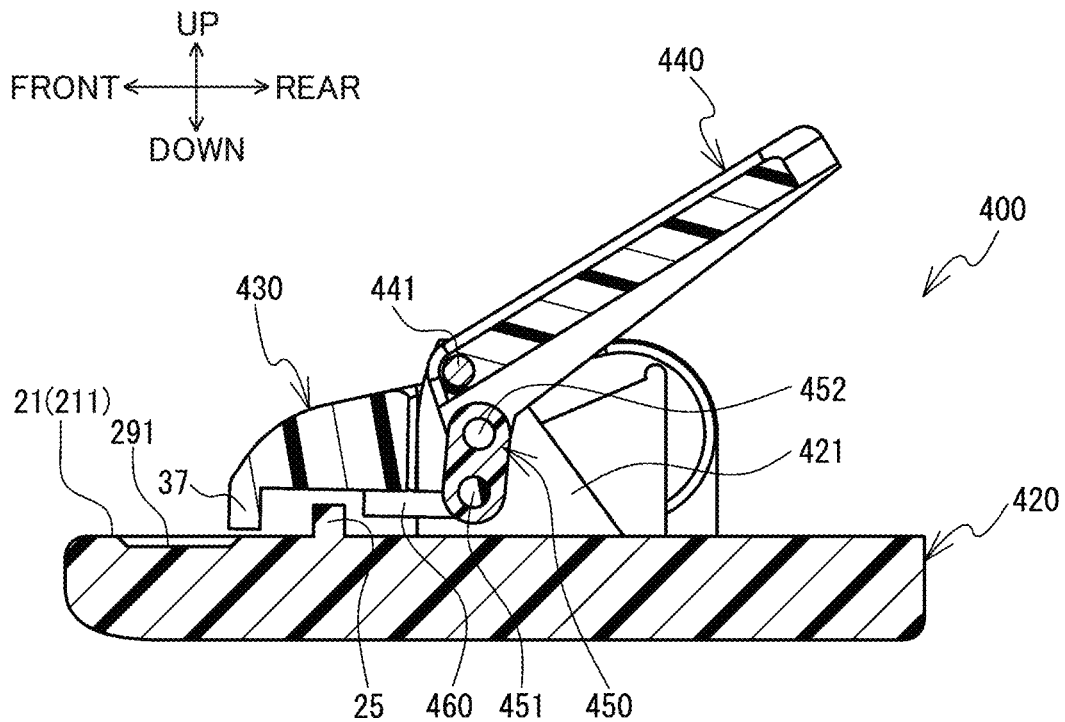
FIG. 19B is a cross-sectional view of the jig 400 according to the fourth embodiment illustrating the state where the lever 440 is further moved down from the state illustrated in FIG. 18B.

In this state, a user places the lower and upper labels 11, 12 in a superposed relation on the label placement region 211 of the upper surface 21 of the base plate 420, and the lower and upper labels 11, 12 are subjected to positioning relative to the first ribs 25 and the second rib 26. Then, the user pushes down the lever 440, which permits the lever 440 to be pivotally moved about the rotation shaft 441 in a clockwise direction in a right side view as illustrated in FIGS. 18B and 19B, so that the first connecting pin 452 is moved frontward.

At this time, the link member 450 is pivotally moved about the first connecting pin 452 in the counterclockwise direction in a right side view. Hence, the second connecting pin 451 is shifted rearward and diagonally downward. Accordingly, an angle defined between the link member 450 and the connecting plate 460 is gradually reduced to move the pressure plate 430 downward toward its closed position.

Figure 20A:
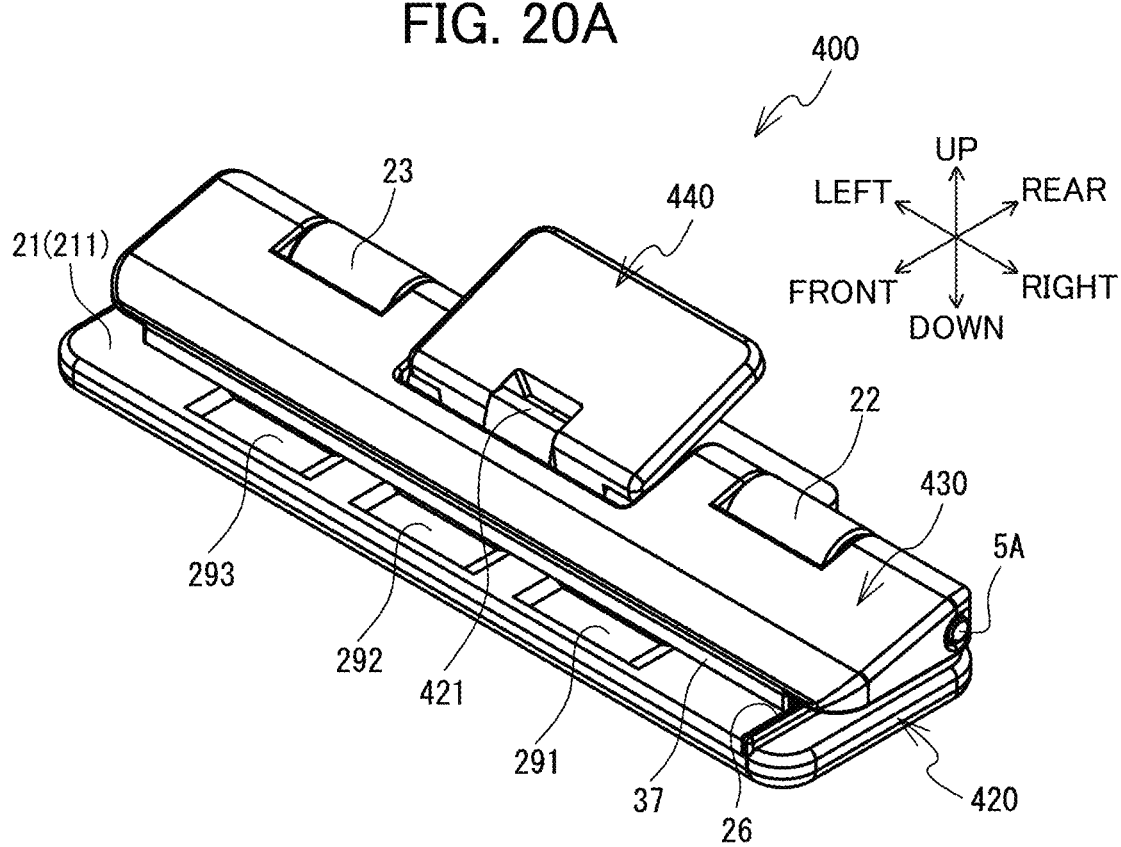
FIG. 20A is a perspective view of the jig 400 according to the fourth embodiment and illustrating a state where the lever 440 is still further moved down from the state illustrated in FIG. 19A.
Figure 20B:
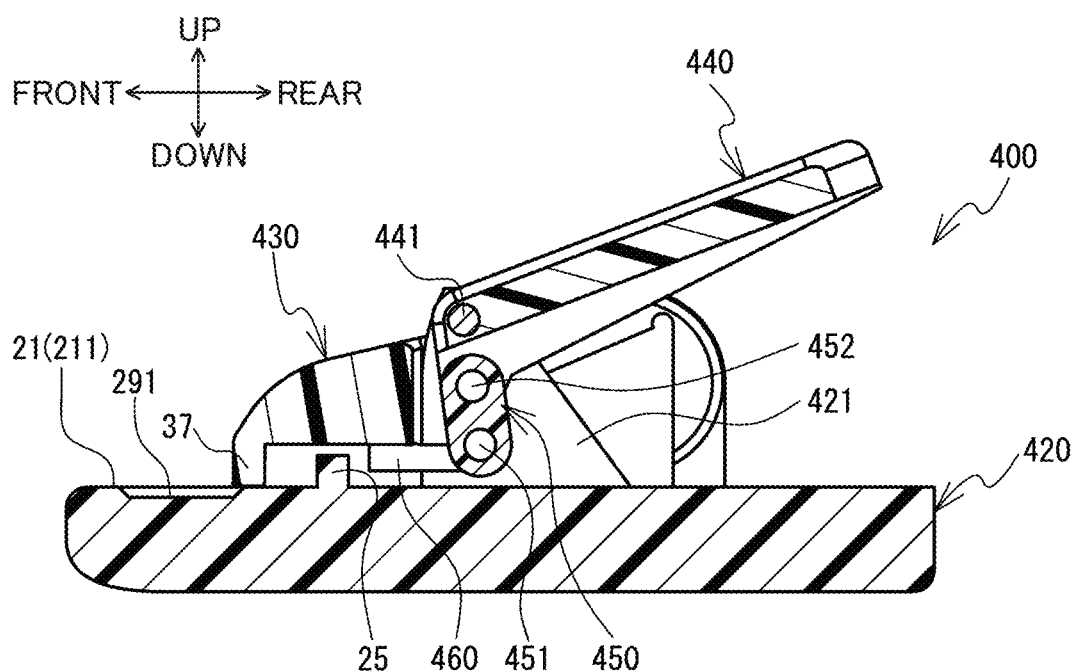
FIG. 20B is a cross-sectional view of the jig 400 according to the fourth embodiment and illustrating the state where the lever 440 is still further moved down from the state illustrated in FIG. 19B.

Then, as illustrated in FIGS. 20A and 20B, when the pressure plate 430 is at a bottom dead center thereof, the rotation shaft 441 connecting the lever 440 to the boss 421, the first connecting pin 452 connecting the lever 440 to the link member 450, and the second connecting pin 451 connecting the link member 450 to the connecting plate 460 of the pressure plate 430 are arrayed in line. That is, the first line segment (connecting the rotation shaft 441 to the first connecting pin 452) and the second line segment (connecting the first connecting pin 452 to the second connecting pin 451) are arrayed in line. At this time, sufficiently large pressing force is applied to the pressure plate 430, and therefore, the pressure rib 37 can nip the rear end portions of the lower and upper labels 11, 12 in cooperation with the upper surface 21 of the base plate 420.

Figure 21A:
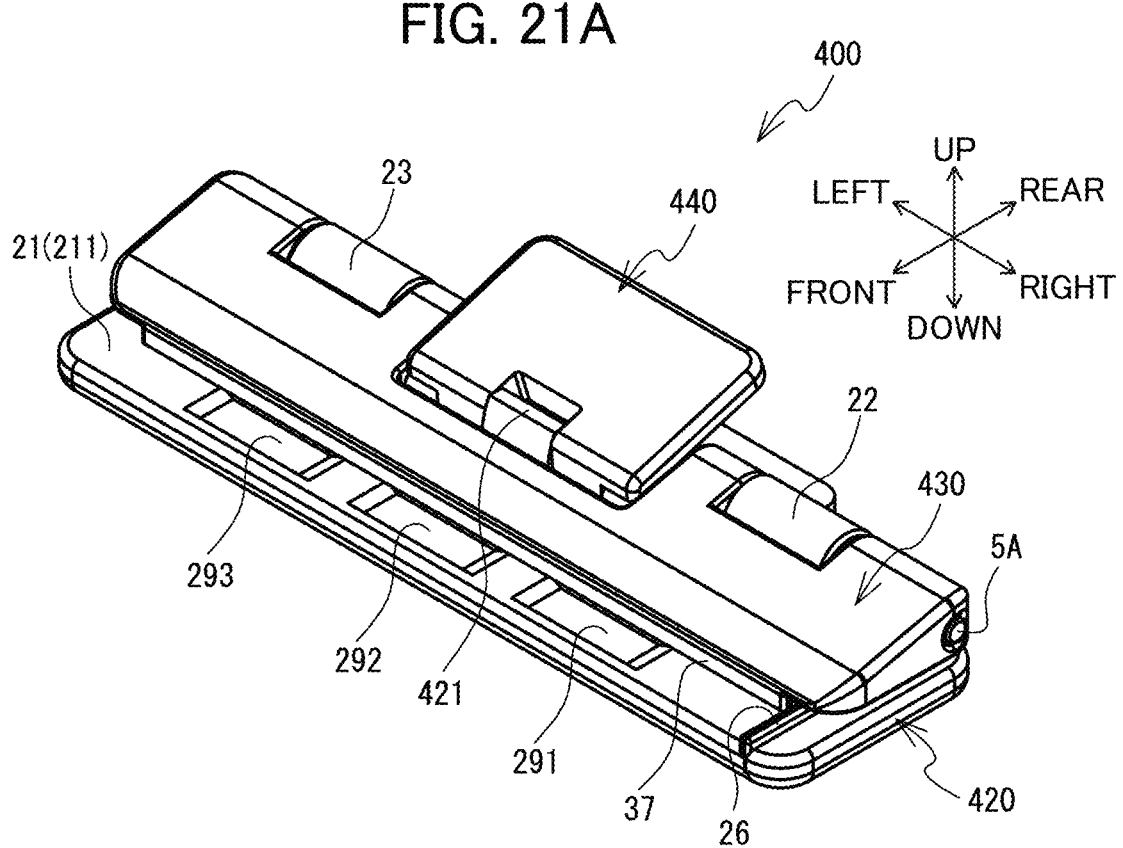
FIG. 21A is a perspective view of the jig 400 according to the fourth embodiment and illustrating a state where the lever 440 is still further moved down from the state illustrated in FIG. 20A.
Figure 21B:
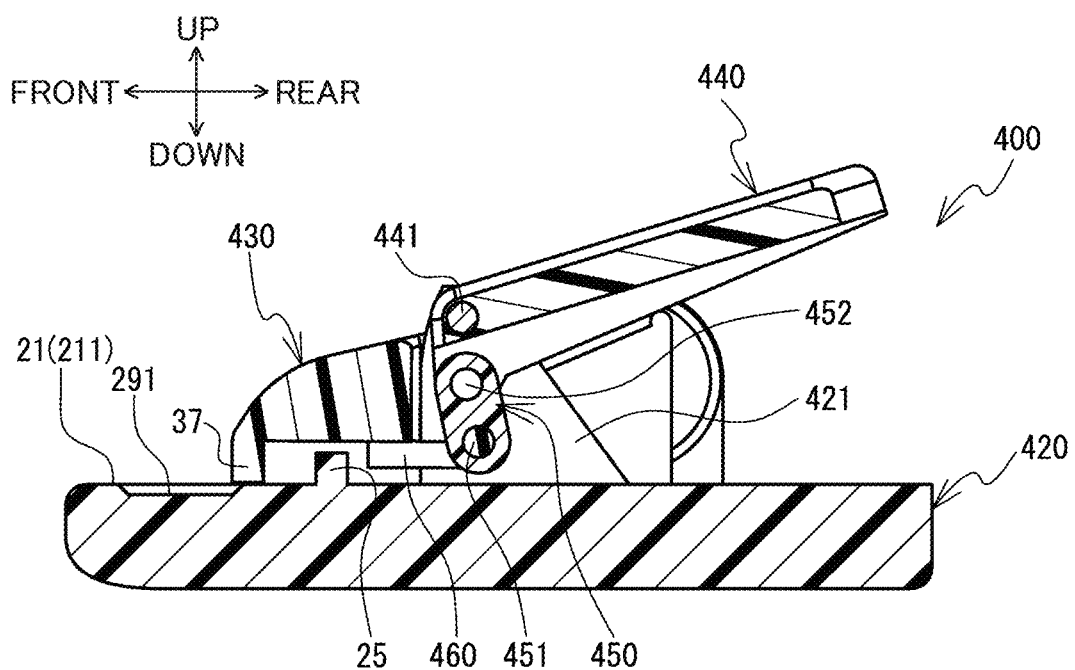
FIG. 21B is a cross-sectional view of the jig 400 according to the fourth embodiment and illustrating the state where the lever 440 is still further moved down from the state illustrated in FIG. 20B.

Further, as illustrated in FIGS. 21A and 21B, the lever 440 can be further slightly moved downward even after the pressure plate 430 reaches the bottom dead center. Hence, when the lever 440 is pushed down to its lowermost position, the lowermost position of the lever 440 can be maintained, since a force directing the lever 440 downward is applied to the lever 440 through the link member 450, even though reaction force (directing in a direction for opening the pressure plate 430) is generated from the pressure plate 430. Thus, the pressure rib 37 presses the rear end portions of the lower and upper labels 11, 12 against the upper surface 21. Hence, similar to the first through third embodiments, the jig 400 according to the fourth embodiment can nip the lower label 11 and the upper label 12 between the base plate 420 and the pressure plate 430.

With respect to the fourth embodiment, the rotation shaft 441, the link member 450, the second connecting pin 451 and the first connecting pin 452 constituting the toggle mechanism are an example of the "pressing-force application portion". The lever 440 is an example of an "operating portion".

Fifth Embodiment

A jig 500 according to a fifth embodiment will be described with reference to FIGS. 22 through 27, wherein like parts and components are designated by the same reference numerals as those of the first embodiment shown in FIGS. 1 through 11B to avoid duplicating description.

In the jig 1 according to the first embodiment, the magnetic force of the magnets 271-274 is utilized for urging the pressure plate 3 to the base plate 2 for closing the pressure plate 3. In contrast, the jig 500 according to the fifth embodiment employs a cam mechanism for urging a pressure plate 530 toward a base plate 520 for closing the pressure plate 530.

Figure 23:
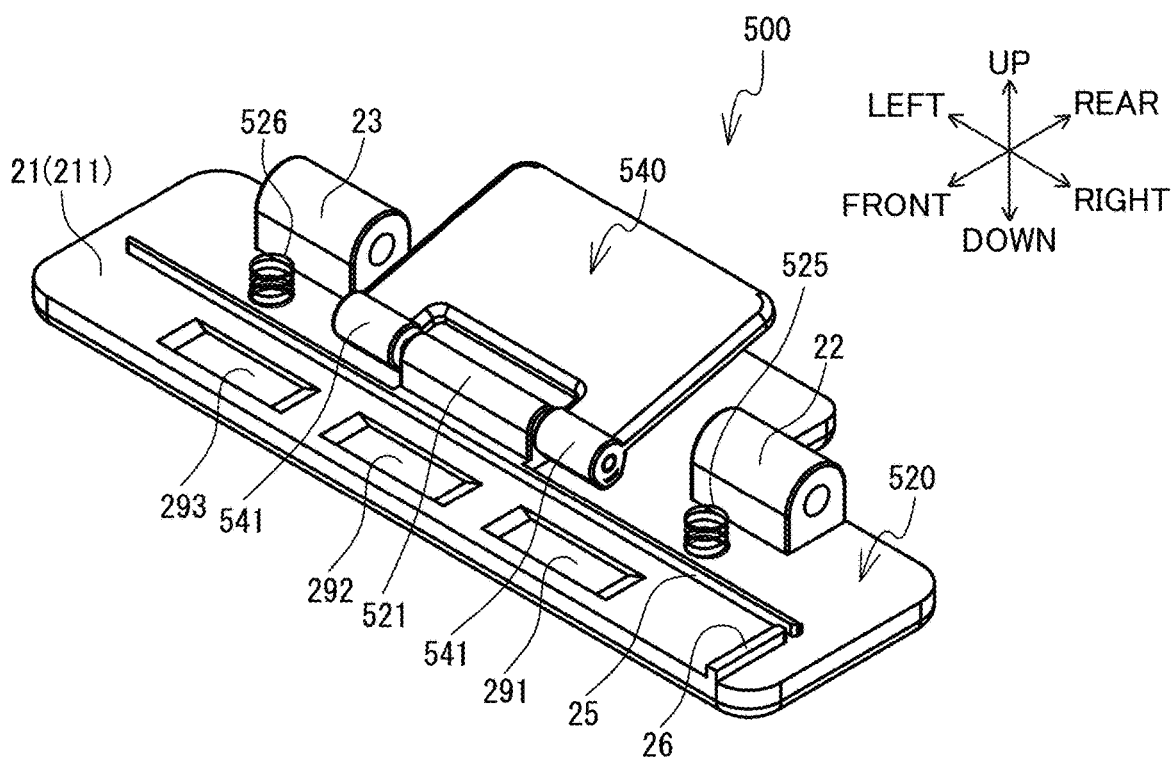
FIG. 23 is a perspective view of the jig 500 according to the fifth embodiment, in which delineation of a pressure plate 530 is omitted.

As illustrated in FIG. 23, the base plate 520 has a similar structure to that of the base plate 3 of the first embodiment. However, the magnets 271-274 are not provided on the upper surface 21 of the base plate 520. Specifically, similar to the first embodiment, the hinges 22 and 23, the rectangular recessed portions 291-293, the first rib 25, and the second rib 26 are provided on the upper surface 21 of the base plate 520. Here, the first rib 25 of the fifth embodiment is one single linearly elongated rib extending in the leftward/rightward direction, as illustrated in FIG. 23, instead of the plurality of ribs 251-255 of the first embodiment.

Further, in the frontward/rearward direction, a coil spring 525 is interposed between the hinge 22 and the first rib 25 and another coil spring 526 is interposed between the hinge 23 and the first rib 25. A boss 521 upstands from the base plate 520 at a position between the coil springs 525 and 526 in the leftward/rightward direction. The boss 521 supports a rotation shaft 542 (see FIG. 26) extending in the leftward/rightward direction.

Figure 22:
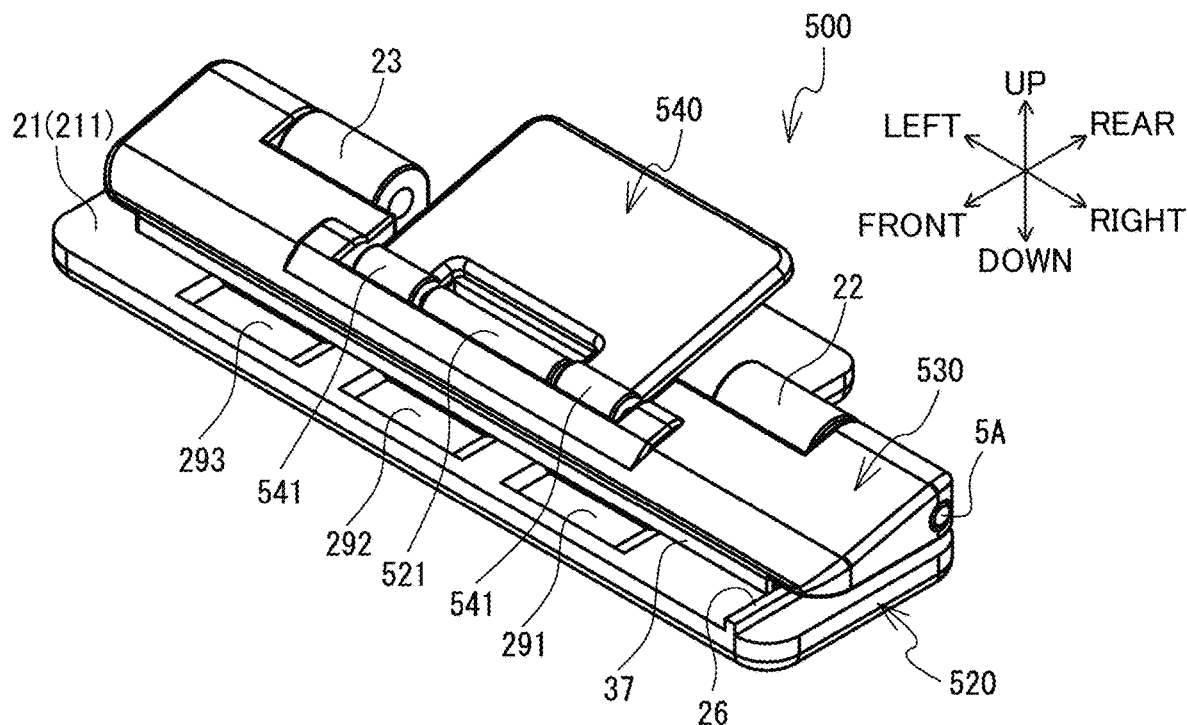
FIG. 22 is a perspective view of a jig 500 according to a fifth embodiment of the disclosure, wherein the jig 500 is in a pressure application state.
Figure 24:
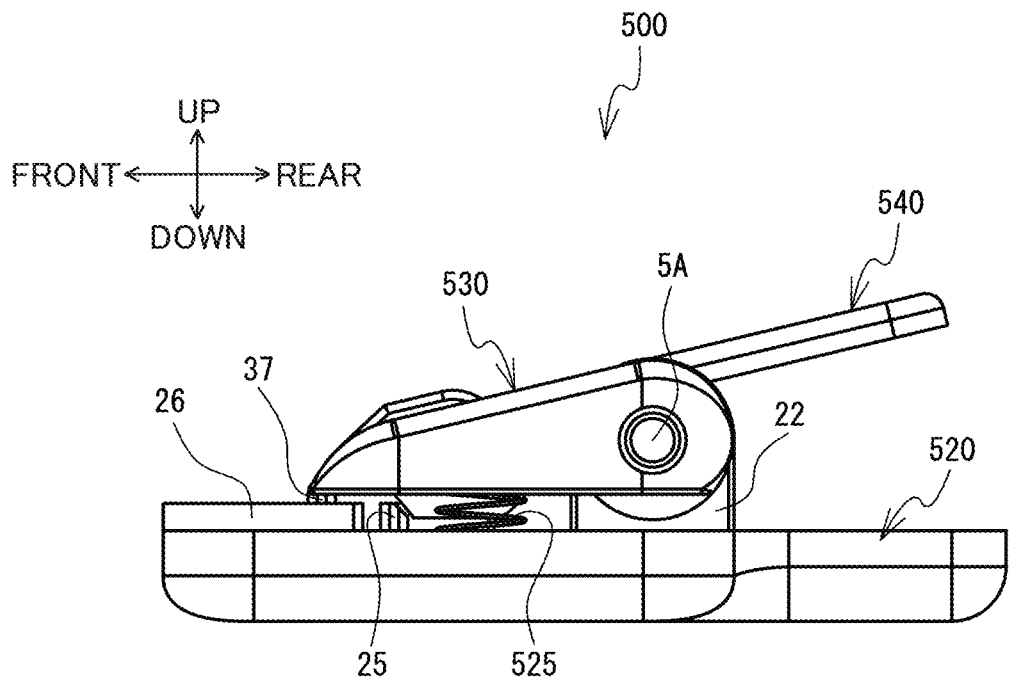
FIG. 24 is a right side view of the jig 500 according to the fifth embodiment in the pressure application state.

As illustrated in FIGS. 22 and 24, the pressure plate 530 has a similar structure to the base plate 3 of the first embodiment, but the lower surface of the base plate 530 is not provided with the magnetic bodies 381-384 of the first embodiment. Further, the pressure plate 530 is pivotally movably connected to the base plate 520 through the hinges 22 and 23 of the base plate 520 to as to be movable between the open position and the closed position. However, pivotally movable stroke of the pressure plate 530 about the axis of the pivot shaft 5A (the axis of the pivot shaft 5B) is restricted within a predetermined range and is smaller than that of the pressure plate 3. Therefore, even in the open position of the pressure plate 530, the first rib 25 and at least a part of the second rib 26 those provided on the upper surface 21 of the base plate 520 are normally covered by the pressure plate 530.

The pressure plate 530 is normally urged upward by the coil springs 525 and 526 positioned on the upper surface 21 of the base plate 520. Hence, the front end portion of the pressure plate 530 is normally lifted upward. The pressure plate 530 has an upper front end portion where a groove 531 (see FIG. 26) opening upward is formed.

Figure 26:
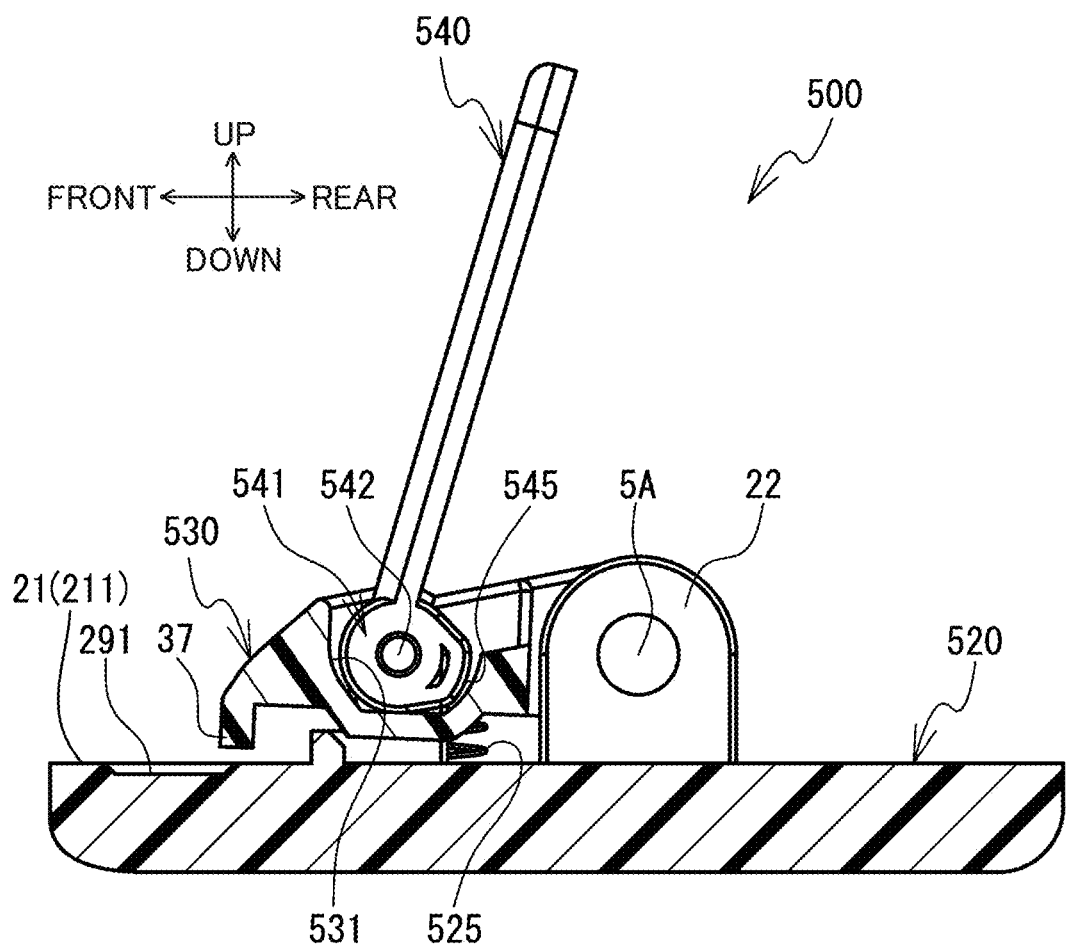
FIG. 26 is a cross-sectional view of the jig 500 according to the fifth embodiment in the pressure release state.
Figure 27:
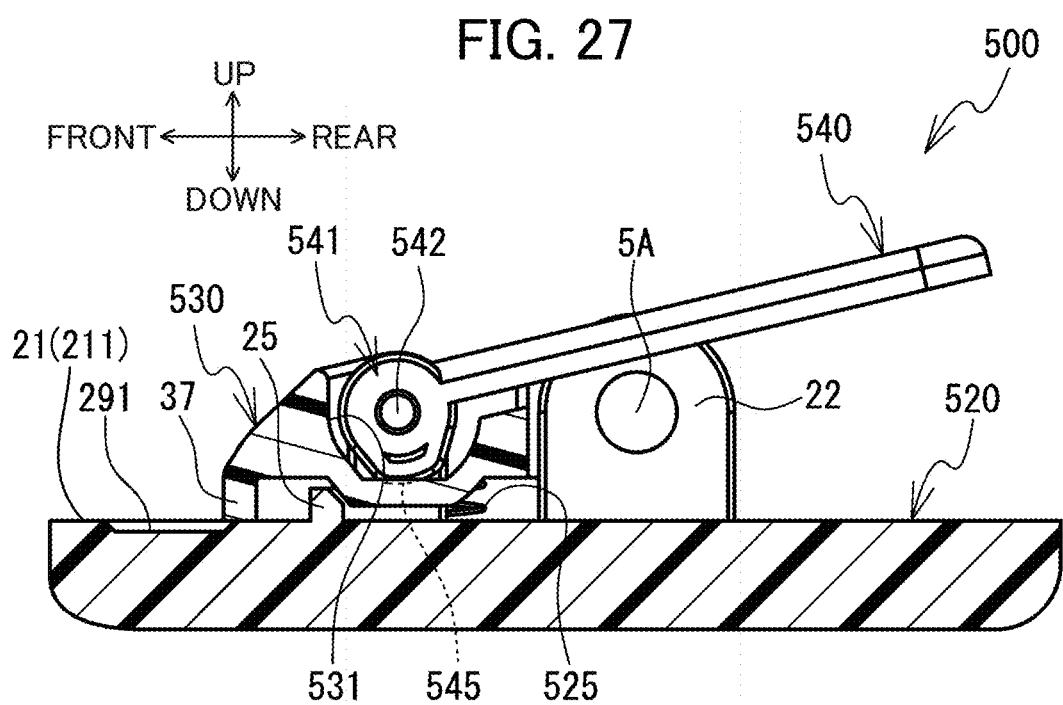
FIG. 27 is a cross-sectional view of the jig 500 according to the fifth embodiment in the pressure application state.
Figure 28A:
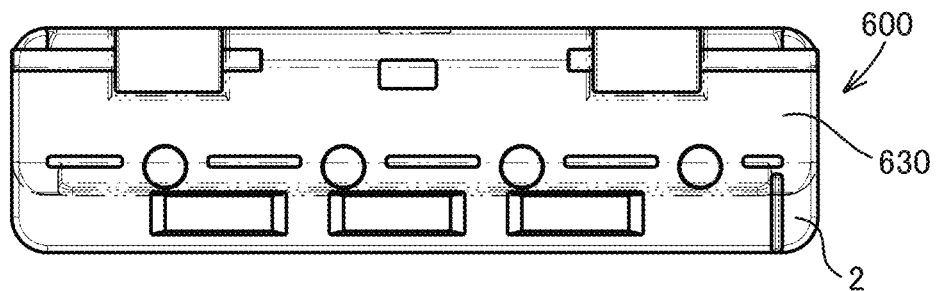
FIGS. 28A-28D are views of a jig 600 according to a variation of the embodiment.
Figure 28B:
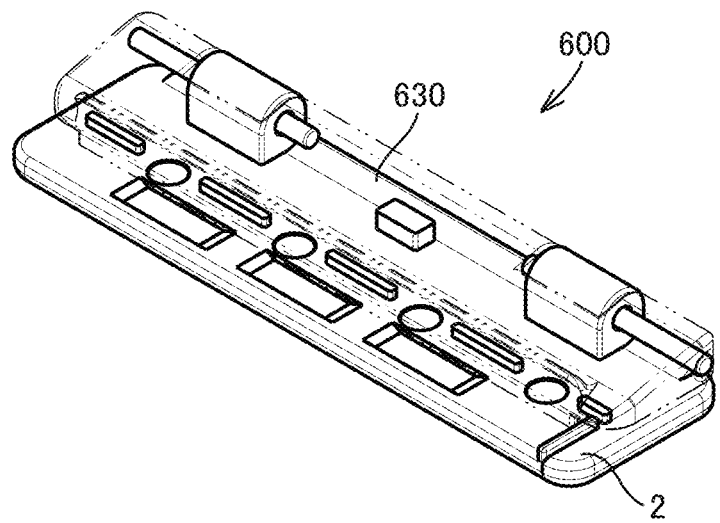
Figure 28C:
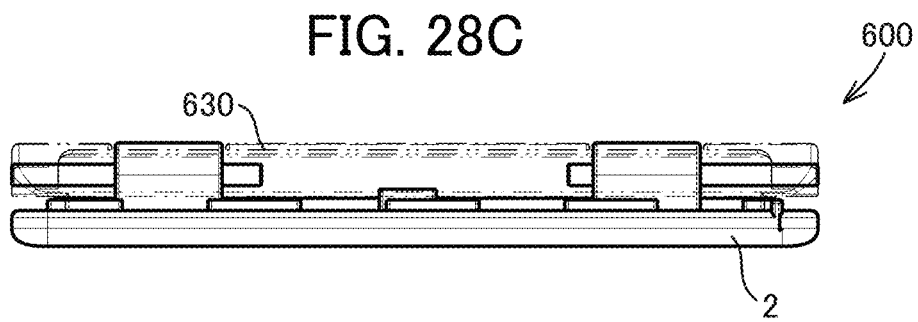
Figure 28D:
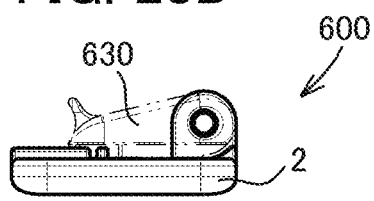

The jig 500 further includes a lever 540 having a generally rectangular plate-like shape. As illustrated in FIGS. 23 and 26, a pair of acting portions 541 is provided one each at each left-right end portion of the base end portion of the lever 540. Each of the left and right acting portions 541 has a generally cylindrical shape extending in the leftward/rightward direction, and is rotatably supported by the rotation shaft 542 supported by the boss 521. A cam portion 545 protrudes radially outwardly from an outer peripheral surface of each acting portion 541 (see FIGS. 26 and 27). The acting portions 541 are positioned inside the groove 531 formed in the pressure plate 530. Each cam portion 545 has an arcuate-shape surface centered on the axis of the rotation shaft 542 and projecting radially outward.

Figure 25:
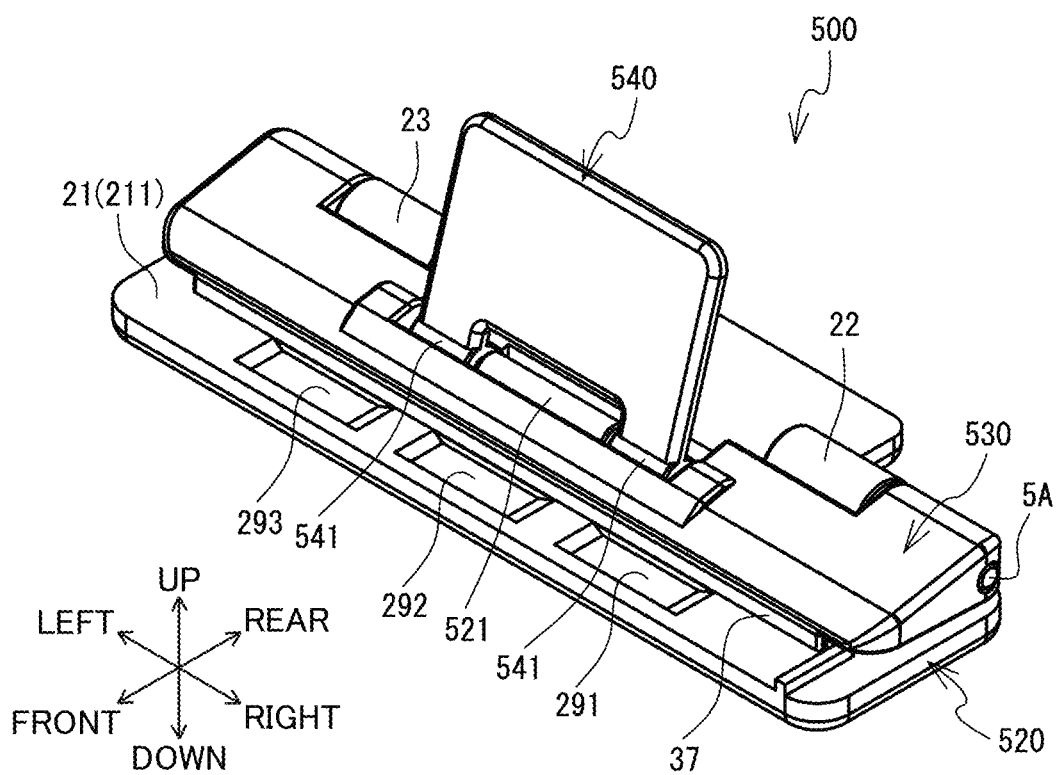
FIG. 25 is a right side view of the jig 500 according to the fifth embodiment, wherein the jig 500 is in a pressure release state.

As illustrated in FIGS. 25 and 26, in a pulled-up state of the lever 540, each cam portion 545 positioned in the groove 531 is directed (protrudes) rearward. At this time, the pressure plate 530 is urged upward by the coil springs 525 and 526 positioned on the upper surface 21 of the base plate 520. Therefore, the pressure rib 37 of the pressure plate 530 is lifted up away from the upper surface 21 of the base plate 520. Hence, the jig 500 can maintain a release state where the upper surface 21 of the base plate 520 is free from the pressure from the pressure rib 37.

A user places the lower and upper labels 11, 12 on the label placement region 211 of the upper surface 21 of the base plate 520, so that the lower and upper labels 11, 12 are subjected to positioning relative to the first rib 25 and the second rib 26.

Then, the user pushes down the lever 540 against the urging force of the coil springs 525, 526. At this time, each acting portion 541 is angularly rotated to pivotally move the cam portion 545 downward. As a result, the respective cam portions 545 push a bottom of the groove 531 downward. The pressure plate 530 is thus pivotally moved downward about the pivot shafts 5A and 5B against the urging force of the coil springs 525 and 526, so that the pressure rib 37 provided at the front end portion of the pressure plate 530 presses the rear end portions of the upper and lower labels 12, 11 on the upper surface 21. The pressure from the pressure rib 37 against the upper surface 21 can be maintained, due to static frictional force generated by the contact between the arcuate-shaped surface of each cam portion 545 and the bottom of the groove 531.

An amount of the downward movement of the pressure rib 37 is dependent on a downward moving amount of the cam portion 545 (by how much the cam portions 545 push down the groove 531), which is dependent on downward pivotally moving amount of the lever 540. With this structure, the jig 500 of the fifth embodiment can properly adjust the nipping force with respect to the lower and upper labels 11 and 12. Hence, similar to the first through fourth embodiments, the jig 500 according to the fifth embodiment can nip the lower label 11 and the upper label 12 between the base plate 520 and the pressure plate 530.

According to the jig 500 of the fifth embodiment, similar to the second through fourth embodiments, the lower end surface of the pressure rib 37 of the pressure plate 530 is positioned lower than the upper end surface of the first rib 25 on the upper surface 21 of the base plate 520 (see FIG. 26) even when the front end portion of the pressure plate 530 is lifted upward as a result of the user's pulling up of the lever 540 (even when the pressure plate 530 is at the open position). Therefore, the rear edges of the lower and upper labels 11, 12 cannot move over the first rib 25 when the lower label 11 and upper label 12 are stacked and placed on the label placement region 211. Hence, accurate abutment of the rear edges of the lower and upper labels 11, 12 against the first rib 25 can be attained.

With respect to the fifth embodiment, the acting portion 541, the cam portion 545 and the groove 531 constituting the cam mechanism are an example of the "pressing-force application portion". The lever 540 is an example of the "operating portion".

Variations and Modifications

The jig according to the present disclosure is not limited to the above-described first through fifth embodiments, but various changes and modifications may be made without departing from the scope of the disclosure.

For example, an entirety of the pressure plate 3 of the first embodiment may be made from transparent resin. For example, FIGS. 28A-28D illustrate a jig 600 including a transparent pressure plate 630, and the base plate 2 of the first embodiment. Still alternatively, a portion of the pressure plate 3 may be made from transparent resin, the portion corresponding to at least the first ribs 251-255 and the second rib 26. The same modification may be available with respect to the pressure plates 230, 330, 430 and 530 of the second through fifth embodiments.

In the first embodiment, instead of the five first ribs 251-255 provided on the upper surface 21 of the base plate 2, a plurality of bar-shaped pins may be linearly arrayed with intervals on the upper surface 21. In the latter case, a protruding length of each pin from the upper surface 21 should be greater than the total thickness of the lower and upper labels 11, 12. Further, instead of the plurality of first ribs, an elongated single first rib (such as the first rib 25 of the fifth embodiment illustrated in FIG. 23) may also be available. Further, the number of first ribs 25 need not be five as in the first embodiment. The number and shape of the second rib 26 may also be changed in the same manner as the modifications available to the five first ribs 251-255.

In the first embodiment, the label placement region 211 is defined by the five first ribs 251-255 and the second rib 26. As an alternative, the label placement region 211 may be provided in a form of a stepped-down portion on the upper surface 21 of the base plate 2. In the latter case, a level difference between the upper surface 21 and the stepped-down portion (label placement region 211) may form a "first regulating portion" (serving as the first ribs 251-255) and a "second regulating portion" (instead of the second rib 26). The level difference should have a height (length) greater than the total thickness of the lower and upper labels 11 and 12. The same modification may be available with respect to the base plate 220, 320, 420 and 520 of the second through fifth embodiments.

In the first embodiment, the first ribs 251-255 are used to provide positioning to the rear edges of the lower and upper labels 11, 12 superposed with each other, and the second rib 26 is used for providing positioning to the right edges of the lower and upper labels 11 and 12. However, the lower label 11 and the upper label 12 may not have a tape-like shape, but may have a shape other than the tape-like shape, such as a triangular shape, a circular shape, or a rhombic shape, for example. If this is the case, one point on the edge (contour) of the lower and upper labels 11 and 12 may be abutted on the first rib, and another point on the edge of the lower and upper labels 11 and 12 may be abutted on the second rib. Here, the other point is at a position contactable with a tangential line which crosses a tangential line contacting the first point.

Figure 29A:
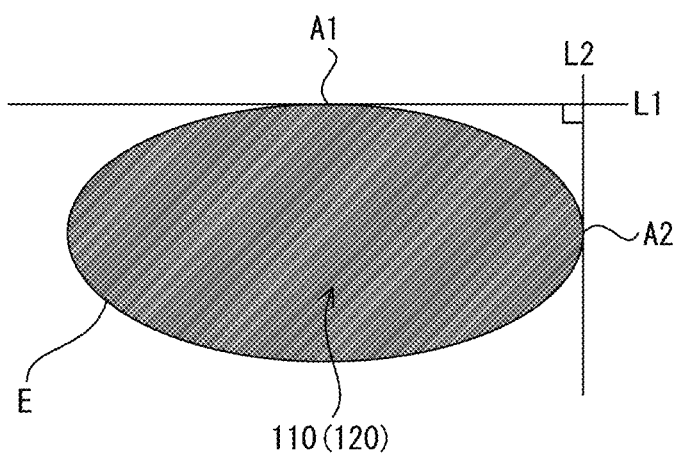
FIGS. 29A-29C are views for description of various methods for setting a first point A1, A3, A5 and a second point A2, A4, A6 at a contour E of a lower label 110 and an upper label 120 having an elliptical shape as modified labels.

For example, FIG. 29A illustrates an example where a lower label 110 and an upper label 120 have an elliptic shape. In this as, a first point A1 on edges E of the lower and upper labels 110 and 120 may be abutted on the first rib providing a tangential line L1, and a second point A2 on the edges E of the lower and upper labels 110 and 120 may be abutted on the second rib providing a tangential line L2 perpendicular to the tangential line L1.

Figure 29B:
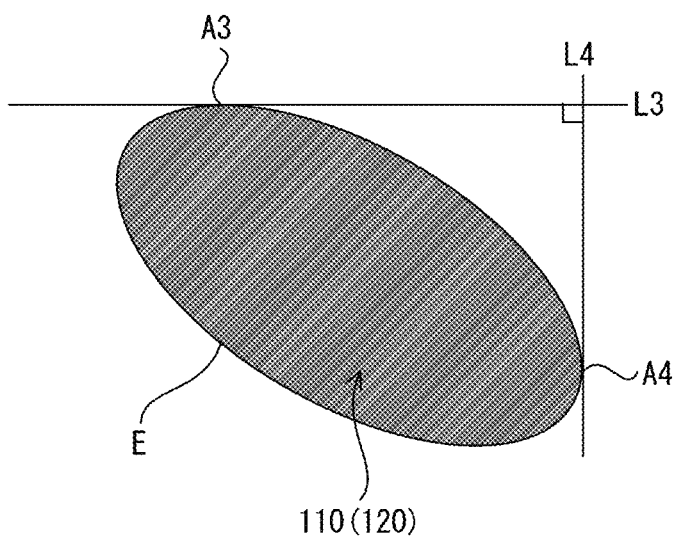

Alternatively, as illustrated in FIG. 29B, in a case where an orientation of the lower and upper labels 110 and 120 are different from that of FIG. 29A, a first point A3 on the edges E of the lower and upper labels 110 and 120 may be abutted on the first rib providing a tangential line L3, and a second point A4 on the edges E of the lower and upper labels 110 and 120 may be abutted on the second rib providing a tangential line L4 perpendicular to the tangential line L3.

Figure 29C:
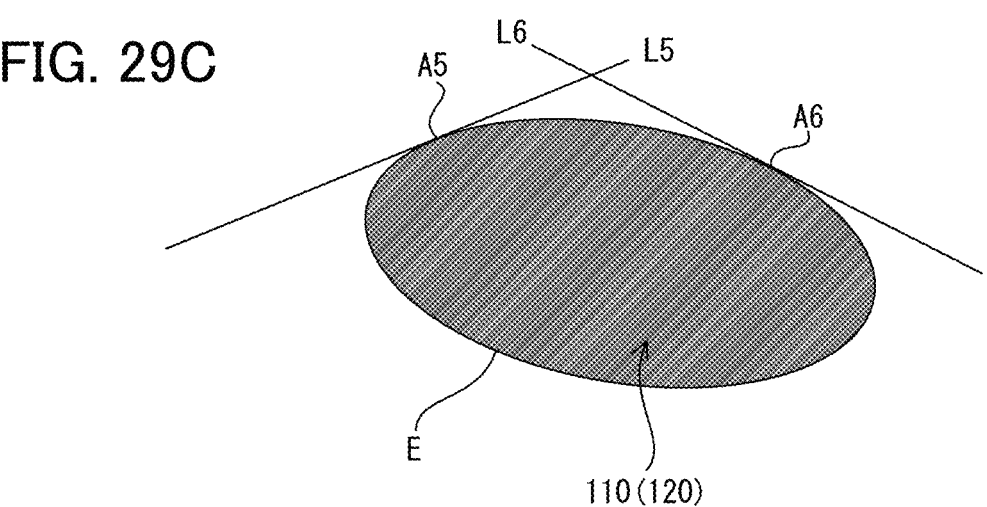

Further, alternatively, the first rib and the second rib may not be oriented perpendicular to each other, and the orientation of the lower and upper labels 110 and 120 may be different from those in FIGS. 29A and 29B. For example, as illustrated in FIG. 29C, a first point A5 on the edges E, of the lower and upper labels 110 and 120 may be set so as to abut on the first rib providing a tangential line L5, and a second point A6 on the edges E of the lower and upper labels 110 and 120 may be set so as to abut on the second rib providing a tangential line L6 crossing the tangential line L5. As such, positioning of the two points on the edges E of the lower and upper labels 110 and 120 can be performed with respect to the first and second ribs. The modifications illustrated in FIGS. 29A-29C may be applicable to the base plate 2, 220, 320, 420 and 520, the first rib 25, and the second rib 26 in the first through fifth embodiments.

In the first embodiment, the four magnets 271-274 are provided on the upper surface 21 of the base plate 2. However, the number of the magnets need not be four, but may be changed arbitrary. Further, the number of the magnetic bodies 381-384 provided on the lower surface 35 of the pressure plate 3 may also be changed arbitrary. Still further, the magnetic bodies 381-384 on the pressure plate 3 may be magnets. In the latter case, the magnets 271-274 provided on the base plate 2 may be magnetic bodies.

Figure 30A:
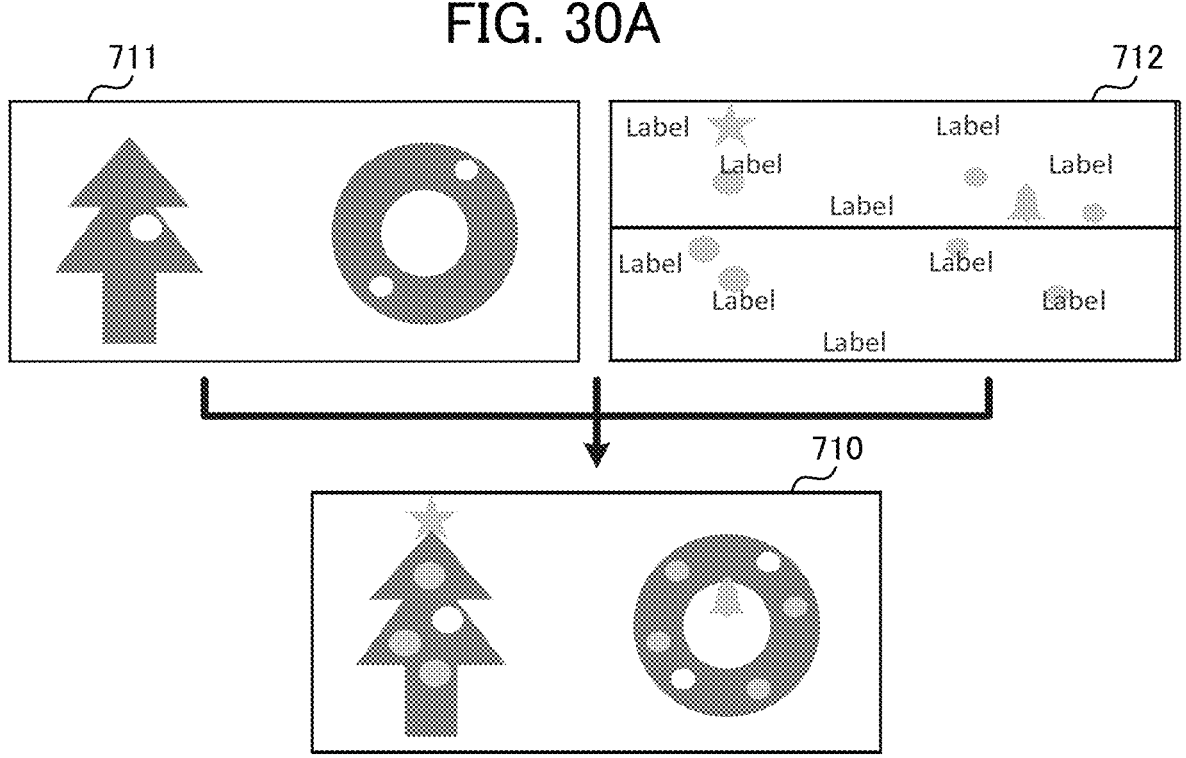
FIGS. 30A and 30B are views for description of a process of creating a laminated label 710 according to a variation of the embodiment by superposing and bonding a transparent upper label 712 having a pattern and a lower label 711 together.
Figure 30B:
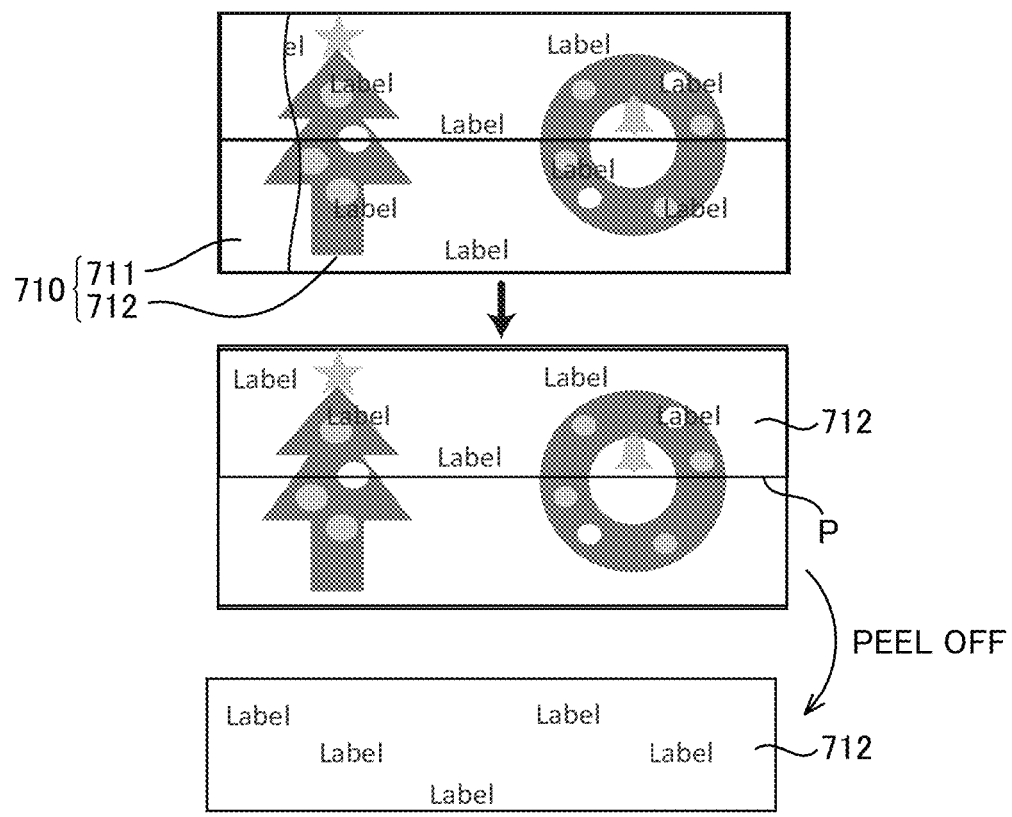
Figure 30C:
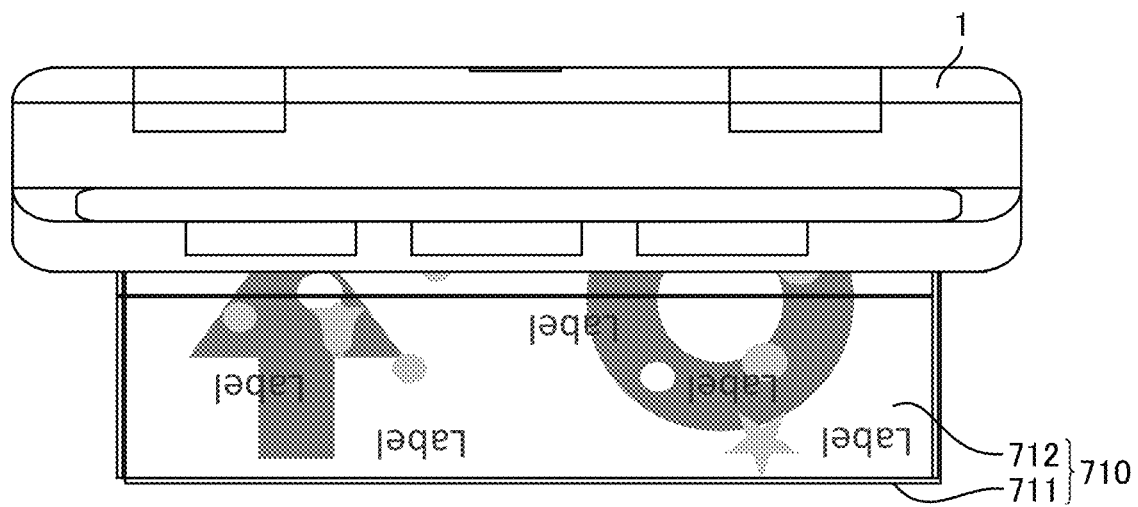
FIG. 30C is a view for description of an incorrect location of the upper label 712 on the lower label 711 in the process of creating the laminated label 710 illustrated in FIG. 30B.

In the first through fifth embodiments, the release sheet of the upper label 12 has the cut line P extending in a longitudinal direction thereof and passing through the widthwise center thereof. However, the position of the cut line P is not limiting. For example, the cut line P may extend in a direction perpendicular to the lengthwise direction of the release sheet. Still alternatively, the release sheet may be a transparent sheet on which a pattern is printed, as illustrated in FIGS. 30A-30B. In the example of FIGS. 30A-30B, positional adjustment between upper and lower labels 712, 711 can be facilitated to create a laminated label 710 due to the transparency of the release sheet, and a user is unlikely to forget peeling off the release sheet, since the release sheet can be easily visually recognized because of the pattern (the text "Label") on the transparent release sheet. Further, even if the upper label 712 is incorrectly set on the lower label 711 placed on the jig 10 as illustrated in FIG. 30C, the user can easily realize the incorrect arrangement of the upper label 712 due to the incorrect orientation of the pattern on the upper label 712.

Further, in the first embodiment, the pressure plate 3 may have a thin plate-like shape. In the latter case, only the upper label 12 may be folded upward along the front edge of the pressure plate 3 while the lower and upper labels 11 and 12 are nipped between the base plate 2 and the pressure plate 3. By this folding, the release sheet may be promptly segmented at the cut line P. At this time, the cut edge portions 121, 122 (see FIG. 11) rise up from the adhesive sheet, thereby facilitating removal of the release sheet from the adhesive sheet.

While the description has been made in detail with reference to the embodiments, it would be apparent to those skilled in the art that many modifications and variations may be made thereto.

What is claimed is:
1. A jig for sticking a first sheet superposed on top of a second sheet to the second sheet in a thickness direction of the first sheet and the second sheet, the first sheet including an adhesive sheet and a release sheet releasably adhered to the adhesive sheet, the first sheet having: a first edge in a first direction perpendicular to the thickness direction; and
   a third edge in a second direction perpendicular to the thickness direction and the first direction, the second sheet having a second edge in the first direction and a fourth edge in the second direction, the jig comprising:
   a first regulating portion on which the first edge and the second edge are configured to be abutted to regulate a position in the first direction of the first sheet superposed on the second sheet to be aligned with a position in the first direction of the second sheet;
   a second regulating portion on which the third edge and the fourth edge are configured to be abutted to regulate a position in the second direction of the first sheet superposed on the second sheet to be aligned with a position in the second direction of the second sheet such that a contour of the first sheet and a contour of the second sheet are aligned with each other;

a nipper configured to nip the first sheet and the second sheet superposed and aligned with each other in the thickness direction such that a part of a peripheral portion of the first sheet is exposed to an outside of the nipper, the part of the peripheral portion of the first sheet including an edge opposite the first edge in the first direction of the first sheet, the nipper including:
  a first abutment portion configured to face the first sheet superposed on top of the second sheet;
  a second abutment portion configured to face the second sheet superposed with the first sheet to nip the first sheet and the second sheet in cooperation with the first abutment portion, the first regulating portion and the second regulating portion being provided at the second abutment portion; and
  a pressing-force application portion configured to apply pressing force to the first abutment portion and the second abutment portion to urge the first abutment portion and the second abutment portion to relatively move toward each other; and
a hinge portion pivotably movably connecting together the first abutment portion and the second abutment portion at one end in the first direction of each of the first and second abutment portions to open and close the first abutment portion with respect to the second abutment portion.

2. The jig according to claim 1, wherein the pressing-force application portion comprises:
  a first magnet provided on the first abutment portion; and
  one of a second magnet and a magnetic body provided on the second abutment portion, the first magnet magnetically attracting the one of the second magnet and the magnetic body to urge the first abutment portion and the second abutment portion to move toward each other.

3. The jig according to claim 1, wherein the pressing-force application portion comprises a spring configured to urge the first abutment portion and the second abutment portion to move toward each other.

4. The jig according to claim 1, wherein the pressing-force application portion comprises a toggle mechanism configured to apply pressuring force to the first abutment portion and the second abutment portion and to release the pressing force to the first abutment portion and the second abutment portion,
  the jig further including an operating portion connected to the toggle mechanism, the toggle mechanism being configured to selectively apply or release the pressing force to the first abutment portion and the second abutment portion in response to a movement of the operating portion.

5. The jig according to claim 1, wherein the pressing-force application portion comprises a cam mechanism configured to apply pressuring force to the first abutment portion and the second abutment portion and to release the pressuring force to the first abutment portion and the second abutment portion,
  the jig further including an operating portion connected to the cam mechanism, the cam mechanism being configured to selectively apply or release the pressing force to the first abutment portion and the second abutment portion in response to a movement of the operating portion.

6. The jig according to claim 1,
wherein the second abutment portion has a placement region on which the first sheet and the second sheet superposed with each other can be placed, and
wherein a length of the first abutment portion in the first direction is shorter than a length of the second abutment portion in the first direction.

7. The jig according to claim 6,
wherein the placement region is sectioned by the first regulating portion and the second regulating portion.

8. The jig according to claim 1,
wherein the first abutment portion has a facing part configured to face the first regulating portion and the second regulating portion, at least the facing part being formed of a transparent member.

9. A set of a jig, a first sheet and a second sheet for use with the jig, the jig being configured to stick the first sheet to an upper surface of the second sheet in a thickness direction of the first sheet and the second sheet,
  the first sheet including:
    an adhesive sheet; and
    a release sheet releasably adhered to the adhesive sheet, the first sheet having a first edge in a first direction perpendicular to the thickness direction, the release sheet having a cut line which segments the release sheet into a first section including the first edge and a second section including an opposite edge opposite to the first edge in the first direction, the first sheet further having a third edge in a second direction perpendicular to the thickness direction and the first direction,
  the second sheet having a second edge in the first direction, the second sheet further having a fourth edge in the second direction, and
  the jig comprising:
    a first regulating portion on which the first edge and the second edge are configured to be abutted to regulate a position in the first direction of the first sheet superposed on the second sheet to be aligned with a position in the first direction of the second sheet;
    a second regulating portion on which the third edge and the fourth edge are configured to be abutted to regulate positions in the second direction of the first sheet and the second sheet superposed with each other such that a contour of the first sheet and a contour of the second sheet are aligned with each other;
    a nipper configured to nip a part of the first sheet and a part of the second sheet such that the first edge and the second edge are superposed with each other in the thickness direction, the part of the first sheet including the first section of the release sheet and excluding the second section of the release sheet, and the part of the second sheet including the second edge, the nipper including:
      a first abutment portion configured to face the first sheet superposed on top of the second sheet;
      a second abutment portion configured to face the second sheet superposed with the first sheet to nip the first sheet and the second sheet in cooperation with the first abutment portion, the first regulating portion and the second regulating portion being provided at the second abutment portion; and
      a pressing-force application portion configured to apply pressing force to the first abutment portion and the second abutment portion to urge the first abutment portion and the second abutment portion to relatively move toward each other; and
    a hinge portion pivotably movably connecting together the first abutment portion and the second abutment portion at one end in the first direction of each of the first and second abutment portions to open and close the first abutment portion with respect to the second abutment portion.

10. The set according to claim 9, wherein a position on the contour of the first sheet configured to abut on the first regulating portion and a position on the contour of the second sheet configured to abut on the first regulating portion are coincident with each other when viewed in the thickness direction.

11. The set according to claim 9, wherein the cut line extends linearly, and
wherein the first regulating portion comprises a rib extending in parallel to the cut line.

12. The set according to claim 9, wherein the release sheet is transparent and a pattern is printed on the release sheet.

13. The set according to claim 9, wherein each of the first sheet and the second sheet has a rectangular shape.

14. The set according to claim 13, wherein the first edge extends in a longitudinal direction parallel to the second direction when the first sheet is regulated by the first regulating portion and the second regulating portion, the first edge being a longitudinal edge of the first sheet,
wherein the second edge extends in the longitudinal direction when the second sheet is regulated by the first regulating portion and the second regulating portion, the second edge being a longitudinal edge of the second sheet, and
wherein the first abutment portion and the second abutment portion are urged to nip the first sheet and the second sheet superposed with each other along the first edge and the second edge in the longitudinal direction.

15. The set according to claim 14, wherein the first abutment portion has a portion having transparency.

16. The set according to claim 15, wherein the portion of the first abutment portion is configured to face the first regulating portion and the second regulating portion.

17. A jig for sticking a first sheet superposed on top of a second sheet to the second sheet in a thickness direction of the first sheet and the second sheet, the first sheet including an adhesive sheet and a release sheet releasably stuck to the adhesive sheet, the first sheet having: a first edge in a first direction perpendicular to the thickness direction; and a third edge in a second direction perpendicular to the thickness direction and the first direction, the second sheet having a second edge in the first direction and a fourth edge in the second direction,
the jig comprising:
a base plate having a rectangular shape, a portion of the first sheet and a portion of the second sheet superposed with each other being configured to be placed on the base plate such that the portion of the first sheet is superposed on the portion of the second sheet and the portion of the second sheet is placed on the base plate, the portion of the first sheet including the first edge and the portion of the second sheet including the second edge;
a pressure plate having a rectangular shape and configured to be urged toward the base plate for nipping, in the thickness direction, the portion of the first sheet and the portion of the second sheet superposed with the first sheet in cooperation with the base plate such that the pressure plate faces the portion of the first sheet;
a hinge portion pivotally movably connecting together the base plate and the pressure plate at each end in the first direction of the base plate and the pressure plate to open and close the pressure plate with respect to the base plate;
a first regulating portion provided on the base plate and on which the first edge and the second edge are configured to be abutted to regulate a position in the first direction of the first sheet superposed on the second sheet to be aligned with a position in the first direction of the second sheet, the first regulating portion extending linearly;
a second regulating portion provided on the base plate and on which the third edge and the fourth edge are configured to be abutted to regulate positions in the second direction of the first sheet and the second sheet superposed with each other such that a contour of the first sheet and a contour of the second sheet are aligned with each other, the second regulating portion extending linearly; and
a pressing-force application portion configured to apply pressing force to the base plate and the pressure plate to urge the base plate and the pressure plate to relatively move toward each other.

18. The jig according to claim 17, wherein the base plate has a placement region having a rectangular shape and on which the first sheet and the second sheet superposed with each other can be placed, the placement region having: a first end extending parallel to the end in the first direction of the base plate; and a second end extending perpendicular to the first end and connected to the first end, and
wherein the first regulating portion is positioned at the first end, and the second regulating portion is positioned at the second end.

19. The jig according to claim 18, wherein the first regulating portion and the second regulating portion are ribs protruding upward in the thickness direction from the base plate.

20. The jig according to claim 19, wherein each of the ribs has a protruding length greater than a sum of thicknesses of the first sheet and the second sheet.

* * * * *